United States Patent
Jackson et al.

(10) Patent No.: US 9,122,999 B2
(45) Date of Patent: Sep. 1, 2015

(54) IMAGE-BASED INVENTORY CONTROL SYSTEM

(71) Applicant: SNAP-ON INCORPORATED, Kenosha, WI (US)

(72) Inventors: David A. Jackson, Point Roberts, WA (US); Steven W. Rogers, Conway, AR (US); Eric Bryan, Conway, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 0 days.

(21) Appl. No.: 13/741,207

(22) Filed: Jan. 14, 2013

(65) Prior Publication Data

US 2013/0232039 A1 Sep. 5, 2013

Related U.S. Application Data

(63) Continuation of application No. 12/538,100, filed on Aug. 7, 2009, now Pat. No. 8,353,456.

(60) Provisional application No. 61/087,565, filed on Aug. 8, 2008.

(51) Int. Cl.
*G06K 7/10* (2006.01)
*G06Q 10/00* (2012.01)
(Continued)

(52) U.S. Cl.
CPC ............... *G06Q 10/00* (2013.01); *B25H 3/00* (2013.01); *B25H 3/028* (2013.01); *G06Q 10/087* (2013.01); *G06T 7/0008* (2013.01); *G06T 2207/20224* (2013.01); *G06T 2207/30108* (2013.01)

(58) Field of Classification Search
CPC .... G06Q 10/00; G06Q 10/087; G06T 7/0008; G06T 2207/20224; G06T 2207/30108; B25H 3/00; B25H 3/028
USPC ................... 235/385, 454; 700/214; 382/103; 348/143
See application file for complete search history.

(56) References Cited

U.S. PATENT DOCUMENTS 5,287,414 A 2/1994 Foster
5,369,261 A 11/1994 Shamir
(Continued)

FOREIGN PATENT DOCUMENTS

CN 101187557 A 5/2008
EP 0 363 350 A1 4/1990
(Continued)

OTHER PUBLICATIONS

Office Action issued in Chinese Patent Application No. 200980137705.5 dated Feb. 5, 2013.
(Continued)

*Primary Examiner* — Kristy A Haupt
(74) *Attorney, Agent, or Firm* — McDermott Will & Emery LLP

(57) ABSTRACT

Inventory control systems for monitoring the removal and replacement of objects are described. An exemplary system includes at least one storage drawer, each storage drawer includes at least one storage location for storing objects, and configured to move in a first direction allowing increasing access to storage locations of the drawer, and a second direction allowing decreasing access to storage locations of the drawer. An image sensing device is provided to form at least one first image of the storage locations when a respective storage drawer moves in the second direction. The system includes a data processor configured to receive information representing images of the storage locations generated by the image sensing device, and determine an inventory condition of the objects stored in the respective storage drawer according to the at least one first image.

13 Claims, 16 Drawing Sheets

(51) Int. Cl.
*G06Q 10/08* (2012.01)
*G06T 7/00* (2006.01)
*B25H 3/00* (2006.01)
*B25H 3/02* (2006.01)

(56) References Cited

U.S. PATENT DOCUMENTS

| | | | |
|---|---|---|---|
| 5,725,096 | A | 3/1998 | Winnard |
| 5,821,993 | A | 10/1998 | Robinson |
| 5,931,781 | A | 8/1999 | De Boer |
| 6,510,522 | B1 | 1/2003 | Heinrich et al. |
| 6,707,381 | B1 | 3/2004 | Maloney |
| 6,816,625 | B2 | 11/2004 | Lewis et al. |
| 6,827,275 | B2 | 12/2004 | Allen |
| 6,840,451 | B2 | 1/2005 | Allen |
| 6,989,747 | B2 | 1/2006 | Konecnik |
| 7,256,682 | B2 | 8/2007 | Sweeney, II |
| 7,317,393 | B2 | 1/2008 | Maloney |
| 7,336,174 | B1 * | 2/2008 | Maloney ............... 340/572.1 |
| 7,920,722 | B2 | 4/2011 | Mita et al. |
| 8,199,246 | B2 | 6/2012 | Ono |
| 8,353,456 | B2 * | 1/2013 | Jackson et al. ............ 235/454 |
| 2002/0143672 | A1 | 10/2002 | Sawasaki |
| 2003/0095710 | A1 | 5/2003 | Tessadro |
| 2004/0113786 | A1 | 6/2004 | Maloney |
| 2004/0190092 | A1 | 9/2004 | Silverbrook et al. |
| 2004/0207512 | A1 | 10/2004 | Bastian |
| 2005/0086514 | A1 | 4/2005 | Han et al. |
| 2007/0023193 | A1 | 2/2007 | King |
| 2007/0067203 | A1 | 3/2007 | Gil et al. |
| 2007/0135965 | A1 | 6/2007 | Nguyen et al. |
| 2008/0059338 | A1 | 3/2008 | Hubbard |
| 2008/0088454 | A1 | 4/2008 | Flores et al. |
| 2009/0060349 | A1 | 3/2009 | Linaker et al. |
| 2009/0063306 | A1 | 3/2009 | Fano et al. |

FOREIGN PATENT DOCUMENTS

| | | |
|---|---|---|
| EP | 0604441 A1 | 7/1994 |
| EP | 1030521 A1 | 8/2000 |
| EP | 1335586 A2 | 8/2003 |
| EP | 1 783 570 A1 | 5/2007 |
| EP | 1 860 041 A | 11/2007 |
| EP | 2014424 A1 | 1/2009 |
| JP | 08-68613 A | 3/1996 |
| JP | 2001-294308 A | 10/2001 |
| JP | 2003-090661 A | 3/2003 |
| JP | 2006-103852 A | 4/2006 |
| WO | 95/27252 A1 | 10/1995 |
| WO | 01/09820 A2 | 2/2001 |
| WO | 02/13136 A2 | 2/2002 |
| WO | 2006/106509 A2 | 10/2006 |
| WO | 2007/118272 A1 | 10/2007 |
| WO | 2008/029159 A1 | 3/2008 |
| WO | WO 2008029159 A1 * | 3/2008 |
| WO | 2008/112731 A2 | 9/2008 |

OTHER PUBLICATIONS

US Office Action issued in U.S. Appl. No. 12/484,138 issued Oct. 2, 2013.
Chinese Office Action for Application No. 200980137855.6 dated Apr. 11, 2013.
US Office Action issued in U.S. Appl. No. 12/484,138 dated Feb. 20, 2013.
Notification of Transmittal of the International Search Report and the Written Opinion of the International Searching Authority issued in International Application No. PCT/US2009/053227 dated Jul. 23, 2013.
Notification Concerning Transmittal of International Preliminary Report on Patentability issued in International Application No. PCT/US2009/053227 dated Aug. 8, 2013.
Chinese Office Action, w/ English translation thereof, issued in Chinese Patent Application No. CN 200980137705.5 dated Jun. 7, 2013.
Chinese Office Action, w/ English translation thereof, issued in Chinese Patent Application No. CN 200980140153.3 dated Oct. 23, 2013.
Chinese Office Action with English translation issued in Chinese Application No. 200980137855.6 dated Nov. 29, 2013.
United States Office Action issued in U.S. Appl. No. 12/484,139 dated Dec. 30, 2013.
Non-Final Office Action U.S. Appl. No. 12/484,138 dated Mar. 14, 2014.
Non-Final Office Action U.S. Appl. No. 12/484,127 dated Mar. 28, 2014.
Notification of Second Office Action Chinese Patent Application No. 200980140152.9 dated Apr. 10, 2014 with English translation.
Supplementary European Search Report EP Application No. EP 09 80 5639.3 dated Apr. 16, 2014.
Chinese Office Action issued in Chinese Application No. 200980140153.3 dated Apr. 25, 2014, w/English translation.
Chinese Office Action issued in Chinese Application No. 200980140152.9 dated Sep. 30, 2014, w/English translation.
Chinese Office Action issued in Chinese Application No. 200980137855.6 dated Jun. 5, 2014, w/English translation.
European Office Action issued in European Application No. 09805642.7-1955 dated Jul. 4, 2013.
European Office Action issued in European Application No. 09 805 644.3-1955 dated Jul. 3, 2013.
Extended European Search Report issued in European Patent Application No. 09805641.9 dated Oct. 19, 2012.
Extended European Search Report issued in European Patent Application No. 09805644.3 dated Sep. 19, 2011.
Extended European Search Report issued in European Patent Application No. 09805642.7 dated Sep. 19, 2011.
International Search Report and Written Opinion issued in International Patent Application No. PCT/US2009/053229, dated Oct. 20, 2011.
International Search Report and Written Opinion issued in International Patent Application No. PCT/US2009/053232, mailed Nov. 1, 2010.
International Search Report issued in International Patent Application No. PCT/US2009/053230, dated Dec. 1, 2010.
Chinese Office Action issued in Chinese Application No. 200980137705.5 dated Jan. 13, 2014, with English Translation.
Chinese Office Action issued in Chinese Patent Application No. 200980137705.5 dated Apr. 28, 2012.
Chinese Office Action issued in Chinese Application No. 200980140153.3 dated Feb. 26, 2014, with English Translation.
Chinese Office Action issued in Chinese Patent Application No. 200980140153.3 dated May 16, 2012.
Chinese Office Action issued in Chinese Application No. 200980140152.9 dated Sep. 3, 2013, with English Translation.
United States Office Action issued in U.S. Appl. No. 13/741,207 dated Jun. 14, 2013.
US Office Action issued in U.S. Appl. No. 12/538,100 on Jun. 5, 2012.
U.S. Office Action issued in U.S. Appl. No. 12/484,139 dated Jan. 19, 2012.
U.S. Office Action issued in U.S. Appl. No. 12/523,100 dated Sep. 28, 2011.
Worksmart Systems, Inc.—Foreign Object Damage (FOD) Tool Control Cabinet (www.worksmartsystems.com <http://www.worksmartsystems.com>), 2pgs., 2006.
European Office Action issued in Application No. 09805639.3 dated Feb. 10, 2015.
Notice of Allowance issued in corresponding U.S. Appl. No. 12/484,138 dated May 8, 2015.
Chinese Decision of Rejection issued in Application No. 200980140152.9 dated Apr. 3, 2015 with English Translation.

* cited by examiner

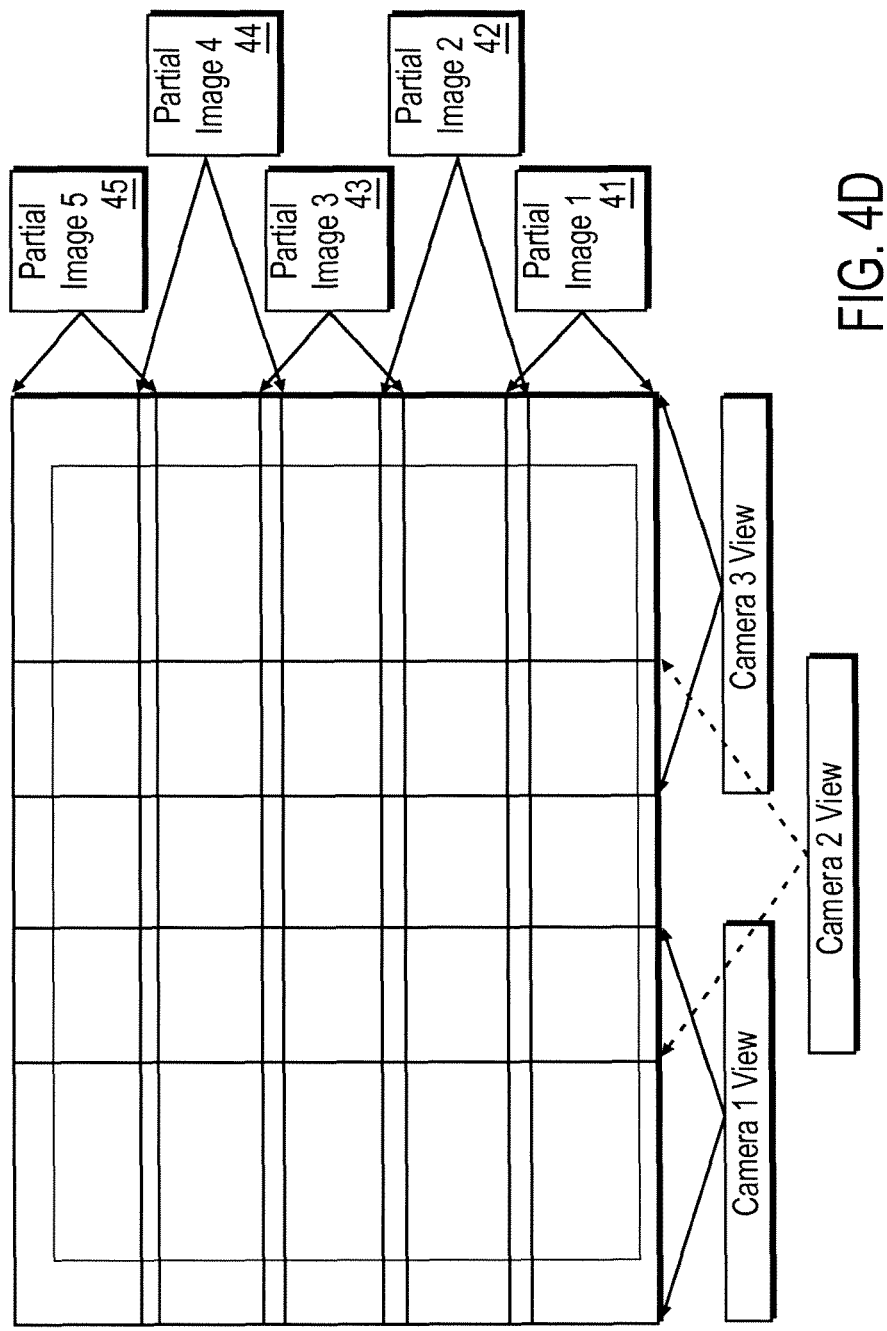

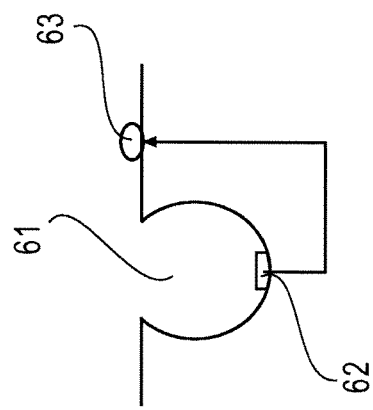
FIG. 5B
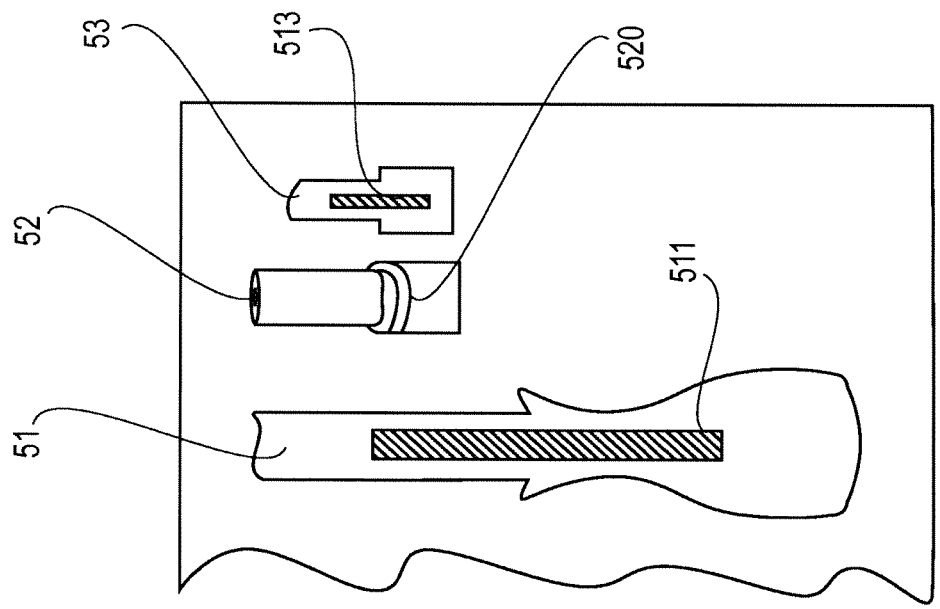
FIG. 5A
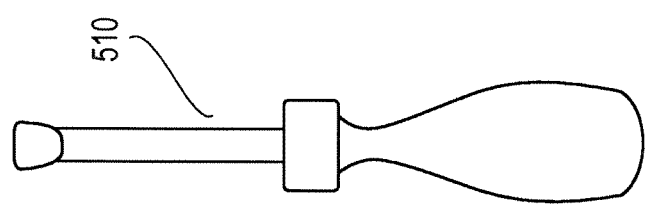

AUDIT TRACK

Audit Trail

| Date / Time | Employee Name |
|---|---|
| 7/31/2008 5:31:12 PM | Andy Mechanic |
| 7/31/2008 3:38:04 PM | Mike Gill |
| 7/31/2008 10:49:04 AM | David Jackson |
| 7/31/2008 9:14:04 AM | Joe Chwan |
| 7/31/2008 8:40:04 AM | Andy Mechanic |
| 7/31/2008 6:37:04 PM | David Jackson |
| 7/30/2008 1:59:04 PM | David Jackson |
| 7/30/2008 11:02:12 AM | Mike Gill |
| 7/30/2008 10:01:43 AM | Joe Chwan |
| 7/30/2008 9:45:24 AM | Mike Gill |
| 7/30/2008 9:28:16 AM | David Jackson |
| 7/30/2008 8:54:27 AM | Joe Chwan |
| 7/30/2008 7:31:18 AM | David Jackson |

FIG. 9A

IMAGE-BASED INVENTORY CONTROL SYSTEM

RELATED APPLICATIONS

This application is a Continuation of U.S. application Ser. No. 12/538,100, filed on Aug. 7, 2009, which in turn claims the benefit of provisional patent application No. 61/087,565, filed on Aug. 8, 2008 and entitled IMAGE-BASED INVENTORY SYSTEM, the disclosures of which Applications are incorporated by reference herein.

FIELD OF DISCLOSURE

The present disclosure relates to an inventory control system, more specifically, to an image-based inventory control system for monitoring the removal and replacement of objects, and identifying objects removed and returned to the system.

BACKGROUND AND SUMMARY OF THE DISCLOSURE

When tools are used in a manufacturing or service environment, it is important that tools be returned to a storage unit, such as a tool box, after use. Employers typically perform a manual inventory check of the tool box to minimize or eliminate the problem of misplacement or theft of expensive tools. Companies can conduct random audits of employee's toolbox to prevent theft and monitor tool location.

Some industries have high standards for inventory control of tools, for preventing incidents of leaving tools in the workplace environment where they could cause severe damages. For the aerospace industry, it is important to ensure that no tools are accidentally left behind in an aircraft or missile being manufactured, assembled or repaired. The Aerospace Industries Association even establishes a standard called National Aerospace Standard including recommended procedures, personnel management and operations to reduce foreign object damage (FOD) to aerospace products. FOD is defined as any object not structurally part of the aircraft. The most common foreign objects found are nuts, bolts, safety wire, and hand tools. Inventory control over tools is critical to prevent tools from being left in an aircraft.

Some toolboxes try to build in inventory determination features to track inventory conditions of tools stored in those toolboxes. For example, some toolboxes dispose contact sensors, magnetic sensors or infrared sensors in or next to each tool storage locations, to detect whether a tool is placed in each tool storage location. Based on signals generated by the sensors, the toolboxes are able to determine whether any tools are missing. While this type of inventory check may be useful to some extents, it suffers from various drawbacks. For instance, if a sensor detects that something is occupying a storage location, the toolbox will determine that no tool is missing from that storage location. However, the toolbox does not know whether the right kind of tool is indeed placed back in the toolbox or it is just some objects placed in the storage location to cheat the system. Furthermore, disposing sensors for numerous storage locations in a toolbox is tedious and costly, and the large number of sensors is prone to damages or malfunctions which will produce false negative or positive alarms.

Accordingly, there is a need for an effective inventory control system that that could assist tracking and accounting for usage of tools and whether they are properly put back after usage. There is also a need for an inventory control system which knows exactly what tool is removed or returned to a tool box. Furthermore, as multiple workers may have access to the same tool box, there is another need for an inventory control system that can track a user and his or her usage of tools, to determine responsibilities for any tool loss or misplacement.

This disclosure describes various embodiments of highly automated inventory control systems that utilize uniquely timed machine vision and methodology to capture images of a storage unit for identifying an inventory condition in the storage unit. Illustrative features may include the ability to control access to the storage unit, determine if objects are in the storage unit or not, determine whether particular tools are in or missing from the storage unit, record images of storage locations and/or their contents, save and retrieve images for audit purposes, associate the images with a person who accessed the storage unit, and other features which will be described herein in detail.

According to one embodiment, an inventory control system for monitoring the removal and replacement of objects, comprises at least one storage drawer, each storage drawer including at least one storage location for storing objects, and configured to move in a first direction allowing increasing access to storage locations of the drawer, and a second direction allowing decreasing access to storage locations of the drawer. An image sensing device is provided to form at least one first image of the storage locations when a respective storage drawer moves in the second direction or after the respective storage drawer stops moving in the second direction. The system includes a data processor configured to receive information representing images of the storage locations generated by the image sensing device, and determine an inventory condition of the objects stored in the respective storage drawer according to the at least one first image.

In one embodiment, the image sensing device is configured to form at least one second image of the storage locations when the respective storage drawer moves in the first direction, before the respective storage drawer moves in the first direction, or after the respective storage drawer stops moving in the first direction. The data processor is configured to determine a change of the inventory condition of the objects stored in the respective storage drawer according to a difference of the at least one first image and the at least one second image.

In one embodiment, an exemplary inventory control system includes multiple storage drawers. Except for a bottom storage drawer, each of the multiple storage drawers is disposed on top of another storage drawer. The image sensing device is disposed at a location sufficient to form an image of at least a portion of the storage locations of the respective storage drawer. The image sensing device may include a camera disposed above the moving path of each respective storage drawer. The image sensing device may have a viewing field over a moving path of each respective storage drawer, and the image sensing device may be disposed at a location sufficient to form an image of at least a portion of the respective storage drawer when the portion of the storage drawer moves past the sensing field. In one embodiment, the image sensing device is configured to capture multiple partial images of the respective storage drawer at different points in time when the storage drawer passes the viewing field. The data processor is configured to form a combined image of the storage drawer by combining the multiple partial images of the storage drawer captured at different points in time, and determines an inventory condition of the storage drawer based on the combined image. The system may further comprises a position detector configured to detect a position of each respective storage drawer when the storage drawer moves. The data processor forms a combined image of the storage drawer according to the multiple partial images and information of positions of the storage drawer detected by the position detector.

In still another embodiment, the image sensing device includes a camera and a light redirecting device. The light redirecting device is configured to direct light reflected from each respective storage drawer to the camera. The camera is disposed at a location remote from the light redirecting device. The light redirecting device may include one or more mirrors, a prism or one or more fiber optic devices. The light redirecting device may be disposed at a location above a moving path of each respective storage drawer when the storage drawer moves.

According to one embodiment, the image capturing device is configured to form an image of the respective storage drawer after detecting the storage drawer stops from moving in the second direction. In one aspect, in forming the at least one first image, the image capturing device forms an image of storage locations of the storage drawer that are not accessible by a user after detecting the storage drawer stops moving in the second direction.

In one embodiment, the at least one first image is taken when the storage drawer is moving. In another embodiment, the data processor is configured to associate the determined inventory condition with time information indicating the time when the at least one first image was taken. In still another embodiment, when a user is authenticated to access to a respective storage drawer, the image sensing device is configured to capture at least one second image of the storage locations of the respective storage drawer before the respective storage drawer moves in the first direction; and the data processor is configured to determine a change in the inventory condition of the objects stored in the respective storage drawer according to a difference between the at least one first image and the at least one second image.

In yet another embodiment, the image sensing device includes multiple cameras. Each camera is configured to capture a partial image of the storage drawer. The data processor is configured to form a combined image of the storage drawer according to the partial image of the storage drawer captured by each respective camera. In still another embodiment, the system further comprises an input device configured to receive information submitted by a user accessing the system, and the data processor is configured to authenticate the user based on the received information, and selectively grant or deny access to the user access to the system according to a result of the authenticating. In one aspect, for each authenticated user who is granted access to the system, the data processor is configured to associate information related to the user to an inventory condition associated with the granted access.

According to another embodiment, each storage location is configured to store a pre-designated object, and the system has access to prestored information identifying a relationship between each storage location and the corresponding pre-designated object. In one aspect, the data processor has access to a baseline image of the storage locations having each storage location occupied by the corresponding pre-designated object; and the data process is configured to determine the inventory condition according to a difference between an image of the storage locations and the baseline image. In another aspect, the data storage device stores a baseline image of the storage locations having each storage location unoccupied by the corresponding pre-designated object; and the data process is configured to determine the inventory condition according to a difference between a captured image of the storage locations and the baseline image.

According to still another embodiment, each respective storage location is associated with an identifier. Depending on whether the storage location is being occupied by an object, the associated identifier appears in an image captured by the image sensing device in one of two different manners. The data processor is configured to determine the inventory condition of objects by evaluating how each identifier appears in the image captured by the image sending device. In one aspect, the identifier is not viewable by the image sensing device when an object is stored in the respective storage location, and is viewable by the image sensing device when an object is not stored in the respective storage location. In another aspect, the identifier is viewable by the image sensing device when an object is stored in the respective storage location, and is not viewable by the image sensing device when an object is not stored in the respective storage location. In still another aspect, each storage location is configured to store a pre-designated object. The data processor has access to information identifying a known relationship between each pre-designated object and each corresponding storage location configured to store the pre-designated object. The data processor is configured to determine an inventory condition of objects by evaluating how each identifier appears in the image captured by the image sensing device, and the relationship between each pre-designated object and each respective storage location. In a further aspect, the identifier is unique to a corresponding object stored in the storage location. The data processor has access to information identifying each object stored in the system and information identifying a relationship between each identifier and each corresponding object. The data processor is configured to determine an inventory condition of the objects by evaluating how each identifier appears in the image captured by the image sensing device, the relationship identifying each object stored in the system, and the information identifying the relationship between each identifier and each corresponding object.

According to still another embodiment, each object includes an attached identifier unique to each object. The data processor has access to prestored information identifying each object stored in the system and information identifying a relationship between each pre-designated object and a respective identifier unique to each pre-designated object. The data processor is configured to determine an inventory condition of objects by evaluating the existence of at least one identifier in an image of the storage locations captured by the image sensing device, and the relationship between each pre-designated object and a respective identifier unique to each pre-designated object.

According to yet another embodiment, the data processor has access to information identifying all objects stored in the storage unit and image characteristics unique to each object. The data processor is configured to determine which objects are missing or which objects are in the system based on the captured image and the image characteristics unique to each object.

According to another embodiment, an exemplary inventory control system for monitoring the removal and replacement of objects, includes at least one storage drawer, each storage drawer includes at least one storage location for storing objects, and each storage drawer is configured to move between a first position, which allows no access to any storage locations in the storage drawer, and a second position, which allows access to at least one storage location in the storage drawer; an image sensing device configured to form images of the storage drawers, wherein when or after a respective storage drawer moves from the second position to the first position, the image sensing device is configured to form at least one image of the storage locations of the respective storage drawer; and a data processor configured to determine an inventory condition of the respective storage drawer according to the at least one image of the storage locations formed after the respective storage drawer moves from the second position to the first position. In one aspect, the image sensing device includes a scan device configured to project a scan light moving over the storage drawer and a camera configured to receive the reflected scan light for forming images of the storage drawer.

According to another embodiment, an inventory control system for monitoring the removal and replacement of objects, includes a storage unit including at least one storage location for storing objects; a detection device configured to detect a termination of each access to the storage unit; an image sensing device is timed to capture at least one first image of the storage locations after the detected termination of access to the storage unit; a data processor configured to receive information representing the at least one first image of the storage locations, and determine an inventory condition of the objects stored in the storage unit according to the at least one first image, associate the determined inventory condition with the terminated access. In one aspect, the image capturing device is timed to capture at least one second image of the storage locations after receipt of an access request for the access. The data processor is configured to determine a change in the inventory condition of the objects according to a difference between the at least one first image and the at least one second image.

According to another embodiment, an inventory control system for monitoring the removal and replacement of objects, comprises at least one storage drawer, each storage drawer includes at least one storage location for storing objects, and each storage drawer is configured to move between a first position, which allows no access to any storage locations in the storage drawer, and a second position, which allows access to at least one storage location in the storage drawer; and a image sensing device configured to form images of the storage drawers, wherein when or after a respective storage drawer moves from the second position to the first position, the image sensing device is configured to form at least one image of the storage locations of the respective storage drawer; and a data processor configured to determine an inventory condition of the respective storage drawer according to the at least one image of the storage locations formed after the respective storage drawer moves from the second position to the first position.

In one aspect, the image sensing device includes a scan device configured to project a scan light moving over the storage drawer and a camera configured to receive the reflected scan light for forming images of the storage drawer.

Anther embodiment of this disclosure provides an inventory control system for monitoring the removal and replacement of objects, comprising a storage unit including at least one storage location for storing objects, a detection device configured to detect a termination of each access to the storage unit, an image sensing device timed to capture at least one first image of the storage locations after the detected termination of access to the storage unit; and a data processor configured to receive information representing the at least one first image of the storage locations, and determine an inventory condition of the objects stored in the storage unit according to the at least one first image. In one aspect, the image capturing device is timed to capture at least one second image of the storage locations after receipt of an access request for the terminated access; and the data processor is configured to determine a change in the inventory condition of the objects according to a difference between the at least one first image and the at least one second image. In another aspect, the system further includes a lock device configured to selectively grant or prohibit access to the storage unit. The data processor is configured to collect information submitted by a user requesting access to the storage unit, authenticate the user based on the collected information, and selectively control the lock device to grant the user access to the storage unit according to a result of the authenticating. For each authenticated user who is granted access to the storage unit, the data processor is configured to associate information related to the authenticated user to an inventory condition associated with the granted access.

According to anther aspect, each storage location is configured to store a pre-designated object; and the data storage device stores information identifying a relationship between each storage location and the corresponding pre-designated object. The data storage device may store a baseline image of the storage locations having each storage location occupied by the corresponding pre-designated object. The data process is configured to determine the inventory condition associated to each access to the storage unit according to a difference between the captured image of the storage locations and the baseline image. In another aspect, the data storage device stores a baseline image of the storage locations having each storage location unoccupied by the corresponding pre-designated object; and the data process is configured to determine the inventory condition associated to each access to the storage unit according to a difference between the captured image of the storage locations and the baseline image.

In another embodiment, each respective storage location is associated with an identifier. Depending on whether the storage location is being occupied by an object, the associated identifier appears in an image captured by the image sensing device in one of two different manners. The data processor configured to determine the inventory condition of objects by evaluating how each identifier appears in the image captured by the image sending device. According to one aspect, the identifier is not viewable by the image sensing device when an object is stored in the respective storage location, and is viewable by the image sensing device when an object is not stored in the respective storage location; or the identifier is viewable by the image sensing device when an object is stored in the respective storage location, and is not viewable by the image sensing device when an object is not stored in the respective storage location.

According to another aspect, each storage location is configured to store a pre-designated object. The data processor has access to information identifying a known relationship between each pre-designated object and each corresponding storage location configured to store the pre-designated object, and the data processor is configured to determine an inventory condition of objects by evaluating how each identifier appears in the image captured by the image sensing device, and the relationship between each pre-designated object and each respective storage location.

According to another aspect, the identifier is unique to a corresponding object stored in the storage location; the data processor has access to information identifying each object stored in the system and information identifying a relationship between each object and a respective identifier unique to each object; and the data processor is configured to determine an inventory condition of the objects by evaluating how each identifier appears in the image captured by the image sensing device, the information identifying each object, and the information identifying the relationship between each object and a respective identifier unique to each object.

According to still another aspect, each object includes an attached identifier unique to each object; the data processor has access to prestored information identifying each object stored in the system and information identifying a relationship between each pre-designated object and a respective identifier unique to each pre-designated object; and the data processor is configured to determine an inventory condition of objects by evaluating the existence of at least one identifier in an image of the storage locations captured by the image sensing device, and the relationship between each pre-designated object and a respective identifier unique to each pre-designated object.

According a further aspect, the data processor has access to information identifying all objects stored in the storage unit and image characteristics unique to each object; the data processor is configured to determine the inventory condition of the objects based on the captured image and the image characteristics unique to each object.

According still another embodiment, each object includes an attached identifier unique to each object; the data storage device stores information identifying each object stored in the system and information identifying a relationship between each pre-designated object and a respective identifier unique to each pre-designated object; and the data processor is configured to determine the inventory condition of objects by evaluating the existence of each identifier, the information identifying each object, and the relationship between each pre-designated object and a respective identifier unique to each pre-designated object.

In another aspect, each storage location is configured to store a pre-designated object; each respective storage location includes an identifier unique to the pre-designated object stored in each respective storage location; the data storage device stores information identifying a relationship between each pre-designated object and a respective identifier unique to each pre-designated object; and the data processor is configured to determine whether any of the objects is missing from the storage locations according to the at least one image of the storage locations captured after the detected access to the storage unit, and the relationship between each pre-designated object and a respective identifier unique to each pre-designated object.

According to a further aspect, the storage unit is configured to operate in a first mode allowing complete access to all storage locations, and a second mode prohibiting access to any storage location; the image sensing device is configured to capture a before-access image when the storage unit operates in the first mode, and an after-access image, subsequent to the first image, when the storage unit operates in the second mode; and the data processor is configured to determine a change in an inventory condition of objects based on the before-access image and the after-access image.

According to another embodiment, an exemplary system further includes a communication device configured to form communication with data processing system remote to the inventory control system, to transmit inventory information of the objects to the data processing system. The data processor may trigger an audio or visual warning signal when the determined inventory condition indicates that at least one object is missing.

According to a further embodiment, a machine-readable medium carrying instructions which, upon execution by a data processing system, control the data processing system to perform steps for managing a networked inventory control system including at least one master storage system associated with multiple slave storage systems. The steps includes determining an authorization level of a user; responsive to the determined authorization level indicating that the user is authorized to access the master storage system, automatically granting the user access to all the multiple slave storage systems associated with the mater storage system; and responsive to the determined authorization level indicating that the user is authorized to access one of the slave storage systems but not the master storage system, granting the user access to the authorized slave storage system, but not the master storage system.

According to another embodiment, a networked inventory control system comprises multiple storage systems. Each respective storage system includes an image sensing device configured to capture at least one image of objects stored in the storage system, and a data storage device configured to store the image captured by the image sensing device and user information with respect to a user accessing the storage system. A data processing system is coupled to the multiple storage systems via a data transmission network. The respective storage system is configured to transmit stored image and user information to the data processing system for each access to the respective storage system. In one aspect, each storage system further includes a data processor configured to determine an inventory condition of the objects stored in the storage system according to the image captured by the image sensing device, and transmit information related to the inventory condition to the data processing system. One of the storage systems may include multiple storage drawers and access to each storage drawer is granted independently.

According a further embodiment, a network-enabled inventory control system comprises a storage unit for storing objects, a data input device configured to receive user information from a respective user requesting access to the inventory control system, an image sensing device configured to capture at least one image of the storage locations corresponding to each access to the inventory control system by the respective user, a data storage device configured to store the user information and the image captured by the image sensing device, a communication device configured to form data communication with a remote data processing system; and a data processor configured to control transmission of data representing the image, the user information and the corresponding access to the remote data processing system via the communication device. In one aspect, the storage unit includes multiple storage drawers; and each storage drawer includes an access control device configured to selectively grant or deny access to the storage drawer. The storage unit may include at least one storage drawer. Each storage drawer includes at least one storage location for storing objects, and is configured to move in a first direction allowing increasing access to storage locations of the drawer, and a second direction allowing decreasing access to storage locations of the drawer. An image sensing device is provided to form at least one first image of the storage locations when a respective storage drawer moves in the second direction or when the respective storage drawer stops moving in the second direction. The data processor receives information representing images of the storage locations generated by the image sensing device, and determines an inventory condition of the objects stored in the respective storage drawer according to the at least one first image.

In one aspect, the exemplary system further includes an access control system configured to selectively granting or denying access to the storage unit. The communication device receives authorization data from the data processing system. The data processor is configured to authenticate a user requesting access to the storage unit by determining a user authorization according to user information input by the user via the data input device and the authorization data, and selectively control the access control device to grant access to the storage unit according to the determined user authorization.

The exemplary data processing systems as described herein may be implemented using one or more computer systems and/or appropriate software.

It is understood that embodiments, steps and/or features described herein can be performed, utilized, implemented and/or practiced either individually or in combination with one or more other steps, embodiments and/or features.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the accompanying drawings, wherein elements having the same reference numeral designations represent like elements throughout and wherein:

FIG. 4d illustrates how an exemplary image is stitched together;

FIGS. 5a and 5b are exemplary identifier designs for use in this disclosure;

FIG. 9a-9d are illustrative images of an exemplary audit record and images taken during access to an exemplary system according to this disclosure.

DETAILED DESCRIPTIONS OF ILLUSTRATIVE EMBODIMENTS

In the following description, for the purposes of explanation, numerous specific details are set forth in order to provide a thorough understanding of the present disclosure. Specifically, operations of illustrative embodiments that utilize machine vision to identify inventory conditions of a storage unit are described in the context of tool management and tool inventory control. It will be apparent, however, to one skilled in the art that concepts of the disclosure may be practiced or implemented without these specific details. Similar concepts may be utilized in other types of inventory control systems such as warehouse management, jewelry inventory management, sensitive or controlled substance management, mini bar inventory management, drug management, vault or security box management, etc. In other instances, well-known structures and devices are shown in block diagram form in order to avoid unnecessarily obscuring the present disclosure.

Overview of Exemplary Tool Storage Systems

Figure 1A:
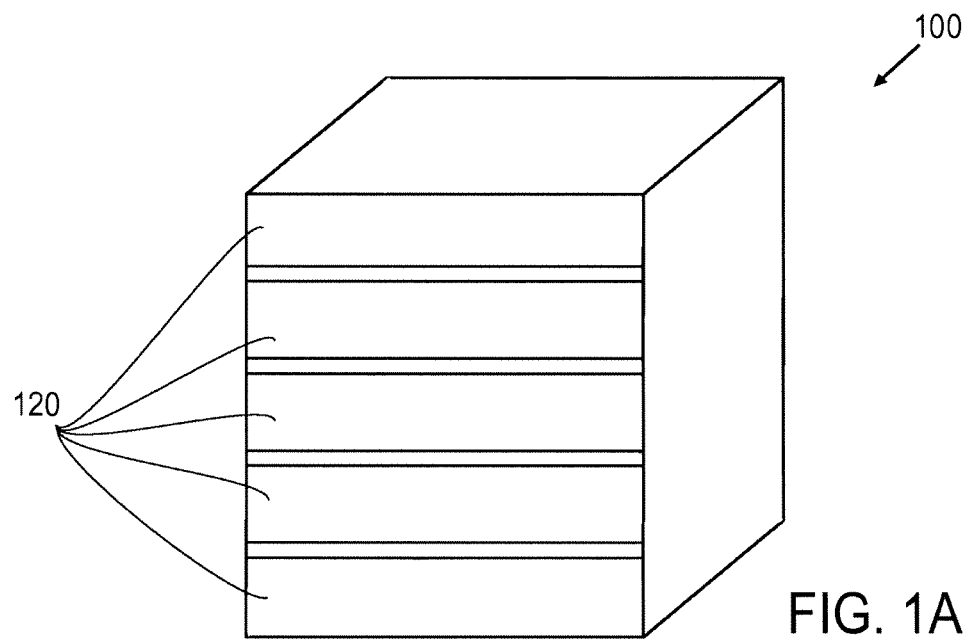
FIGS. 1a and 1b show exemplary storage units in which embodiments according to this disclosure may be implemented.
Figure 1B:
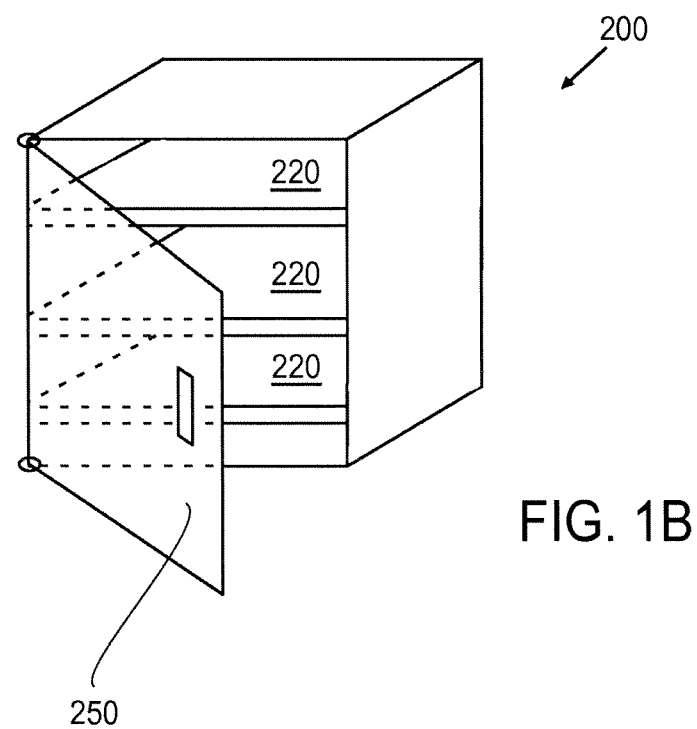

FIGS. 1a and 1b show exemplary storage units in which inventory control systems according to this disclosure may be implemented. FIG. 1a is an exemplary tool storage system 100 including multiple storage drawers 120. Each storage drawer 120 includes multiple storage locations for storing various types of tools. As used throughout this disclosure, a storage location is a location in a storage system for storing or securing objects. In one embodiment, each tool has a specific pre-designated storage location in the tool storage system.

Each storage drawer operates between a close mode, which allows no access to the contents of the drawer, and an open mode, which allows partial or complete access to the contents of the drawer. When a storage drawer moves from a close mode to an open mode, the storage drawer allows increasing access to its contents. On the other hand, if a storage moves from an open mode to a close mode, the storage drawer allows decreasing access to its contents. As shown in FIG. 1a, all storage drawers 120 are in close mode.

A locking device may be used to control access to the contents of the drawers 120. Each individual drawer 120 may have its own lock or multiple storage drawers 120 may share a common locking device. Only authenticated or authorized users are able to access to the contents of the drawers.

The storage drawers may have different sizes, shapes, layouts and arrangements. FIG. 1b shows another type of tool storage system 200 which includes multiple storage shelves or compartments 220 and a single door 250 securing access to the storage shelves 250. The storage shelves or compartments may come in different sizes, shapes, layouts and arrangements.

Figure 2:
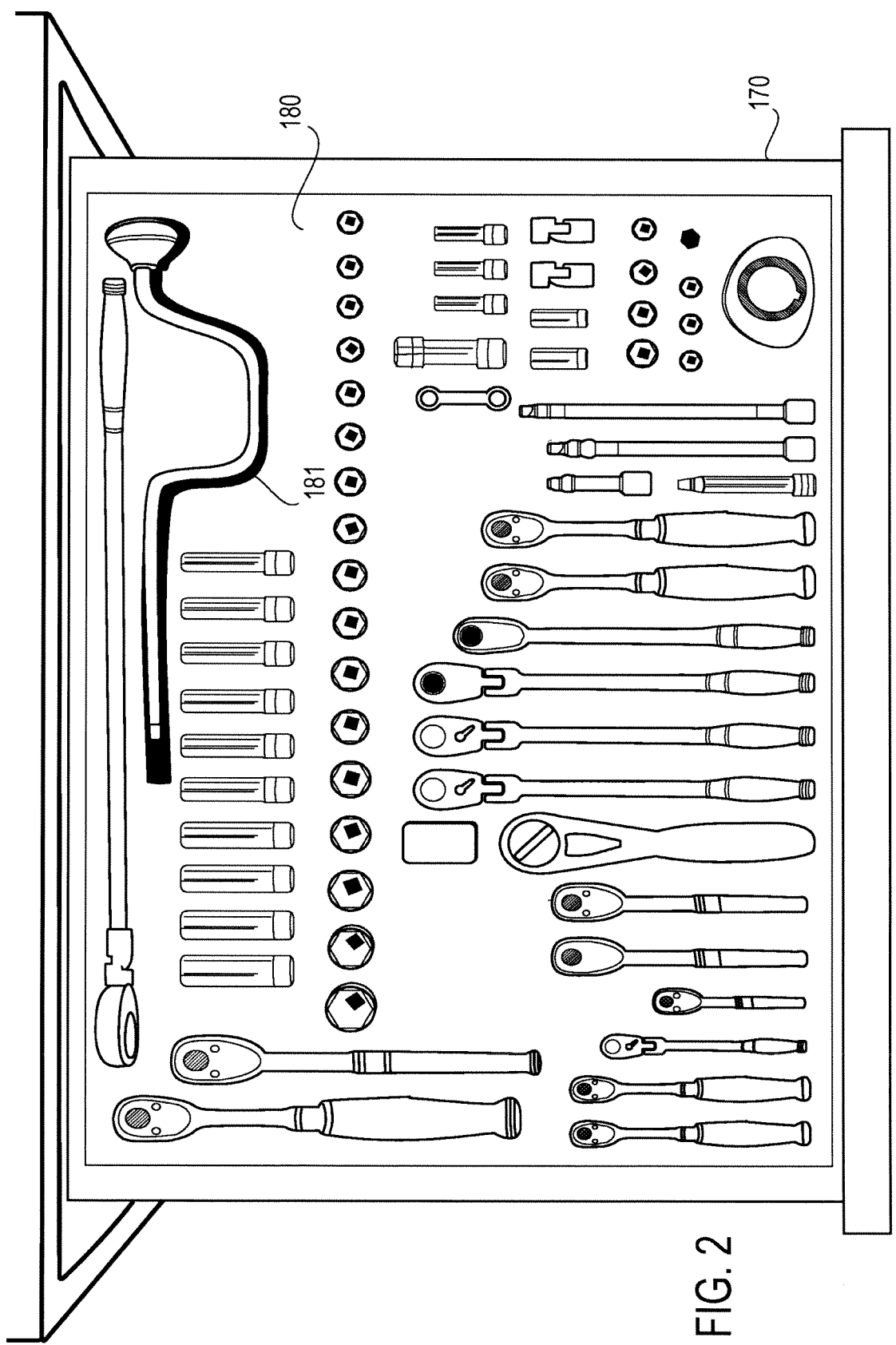
FIG. 2 shows details inside an exemplary storage drawer operated in the open mode.

FIG. 2 shows details inside an exemplary storage drawer 120 in the open mode. Each storage drawer 120 includes a foam base 180 having at least one storage location, such as cutouts 181, for storing tools. Each cutout is specifically contoured and shaped for fittingly receiving a tool with corresponding shapes. Tools may be secured in each storage location by using hooks, Velcro, latches, pressures from the foam, etc.

Figure 3:
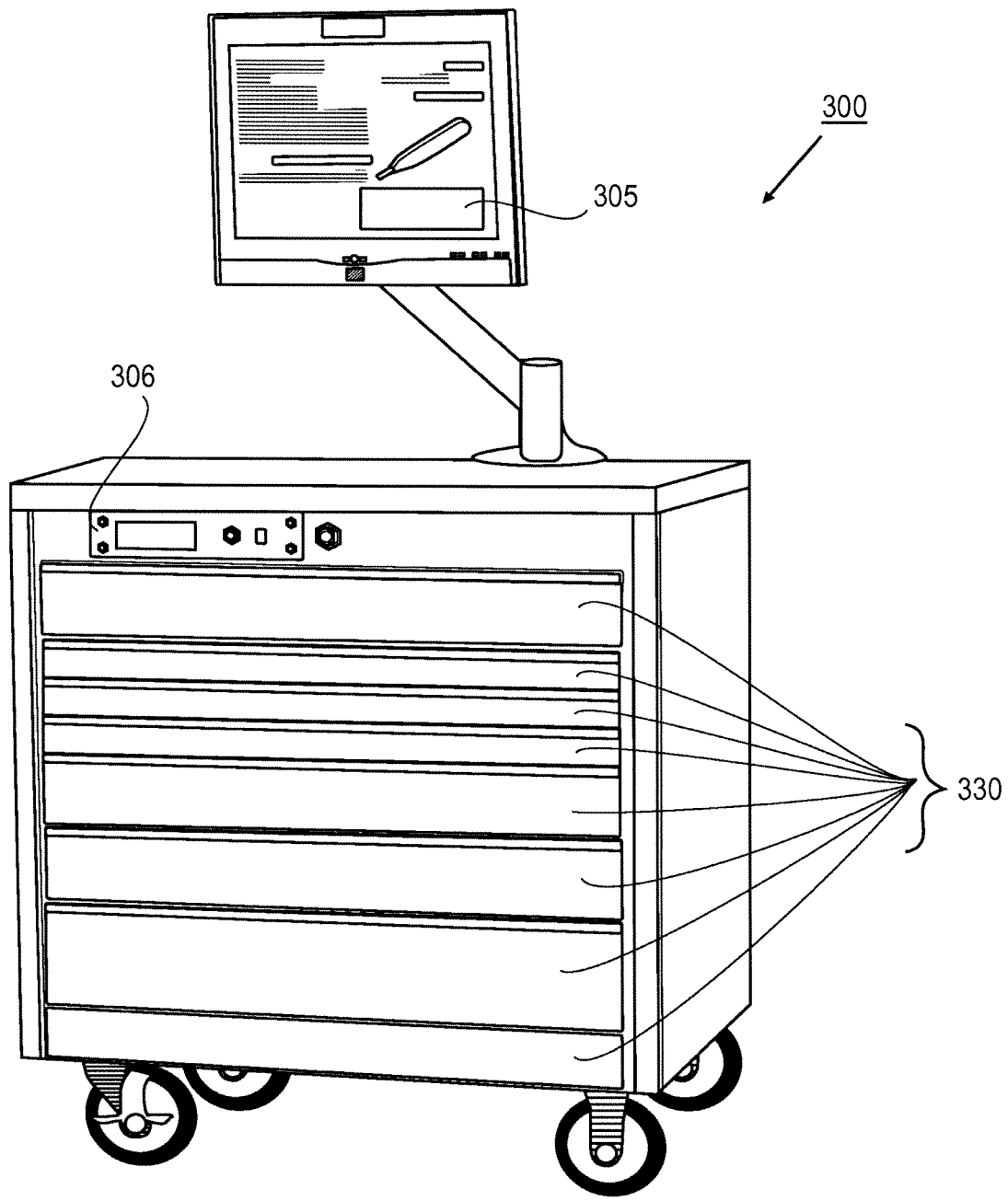
FIG. 3 shows an exemplary tool storage system according to this disclosure.

FIG. 3 shows an exemplary inventory control system implemented as a tool storage system 300 according to this disclosure for storing tools. Storage system 300 includes a display 305, an access control device 306, such as a card reader, for verifying identity and authorization levels of a user intending to access storage system 300, multiple tool storage drawers 330 for storing tools. Tool storage system 300 includes an image sensing device configured to capture images of contents or storage locations of the system. The image sensing device may be lens-based cameras, CCD cameras, CMOS cameras, video cameras, or any type of device that captures images. System 300 includes a data processing system, such as a computer, for processing images captured by the image sensing device. Images captured or formed by the image sensing device are processed by the data processing system for determining an inventory condition of the system or each storage drawer. The term inventory condition as used throughout this disclosure means information relating to an existence or non-existence condition of objects.

The data processing system may be part of tool storage system 300. In one embodiment, the data processing system is a remote computer having a data link, such as a wired or wireless link, coupled to tool storage system 300; or a combination of a computer integrated in storage system 300 and a computer remote to storage system 300. Detailed operations for forming images and determining inventory conditions will be discussed shortly.

Drawers 330 are similar to those drawers 120 shown in FIG. 1a. Display 305 is an input and/or output device of storage system 330, configured to output information. Information entry via display 305 is possible such as by using a touch screen display. Access control device 306 is used to limit access to tool storage drawers 330 to authorized users only. Access control device 306, through the use of one or more locking devices, keeps all storage drawers 330 locked in a closed position until access control device 306 authenticates a user's authorization for accessing storage system 300. Access control device 306 may use one or more access authentication means to verify a user's authorization levels, such as by using a key pad to enter an access code, a keycard reader to read from a key card or fobs authorization level of a user holding the card or fob, biometric methods such as fingerprint readers or retinal scans, or other methods. If access control device 306 determines that a user is authorized to access storage system 300, it unlocks some or all storage drawers 330, depending on the user's authorization level, allowing the user to remove or replace tools. In one embodiment, access to each storage drawer 300 is controlled and granted independently. Based on an assigned authorization or access level, a user may be granted access to one or more drawers of system 300, but not to other drawers. In one embodiment, access control device 306 relocks a storage drawer 330 when or after a user closes the drawer.

The location of access control device 306 is not limited to the front of storage system 300. It could be disposed on the top of the system or on a side surface of the system. In one embodiment, access control device 306 is integrated with display 305. User information for authentication purpose may be input through display device with touch screen functions, face detection cameras, fingerprint readers, retinal scanners or any other types of devices used for verifying a user's authorization to access storage system 300.

Figure 4A:
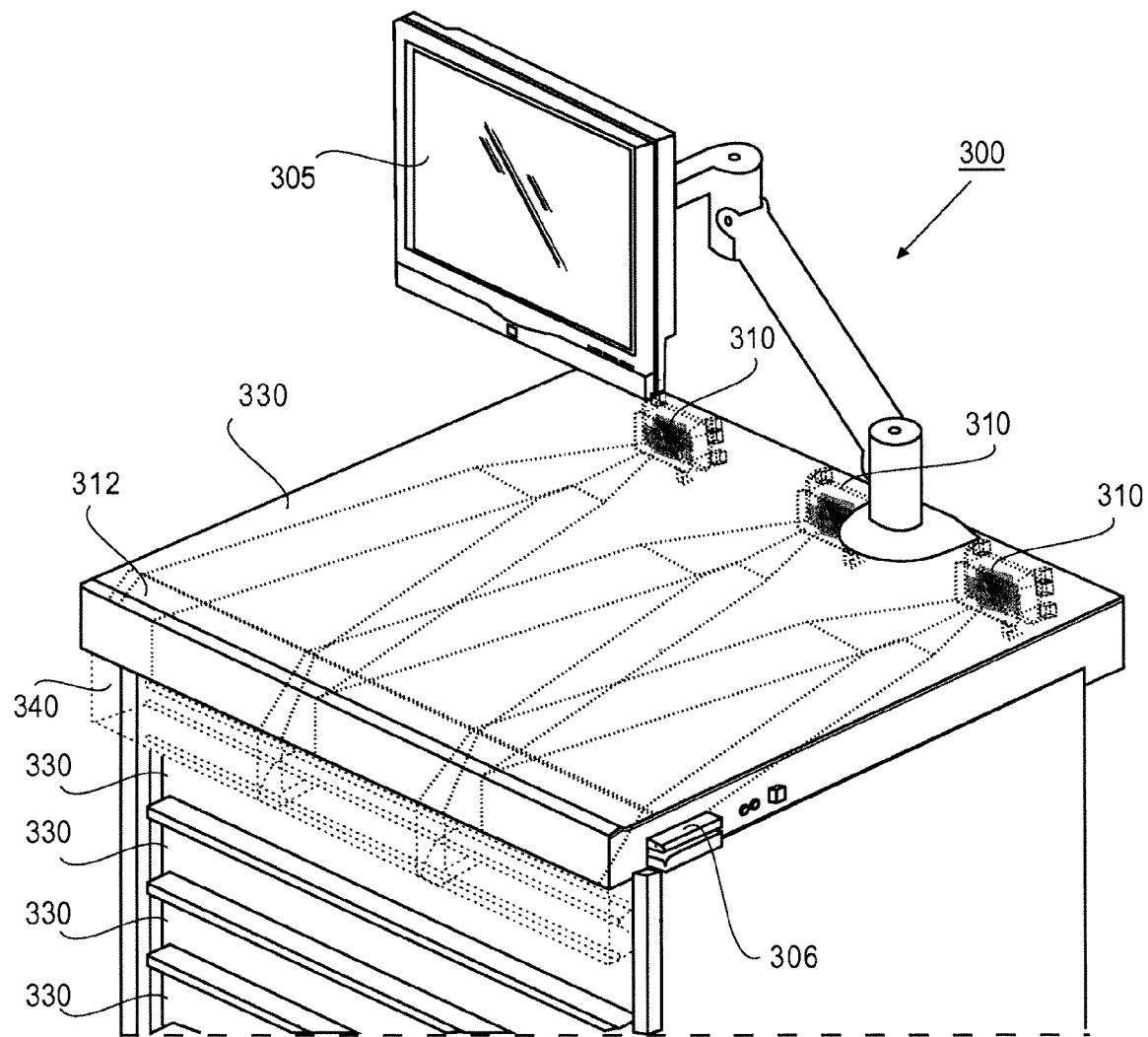
FIGS. 4a-4c and 4e are different views of the tool storage system shown in FIG. 3.
Figure 4B:
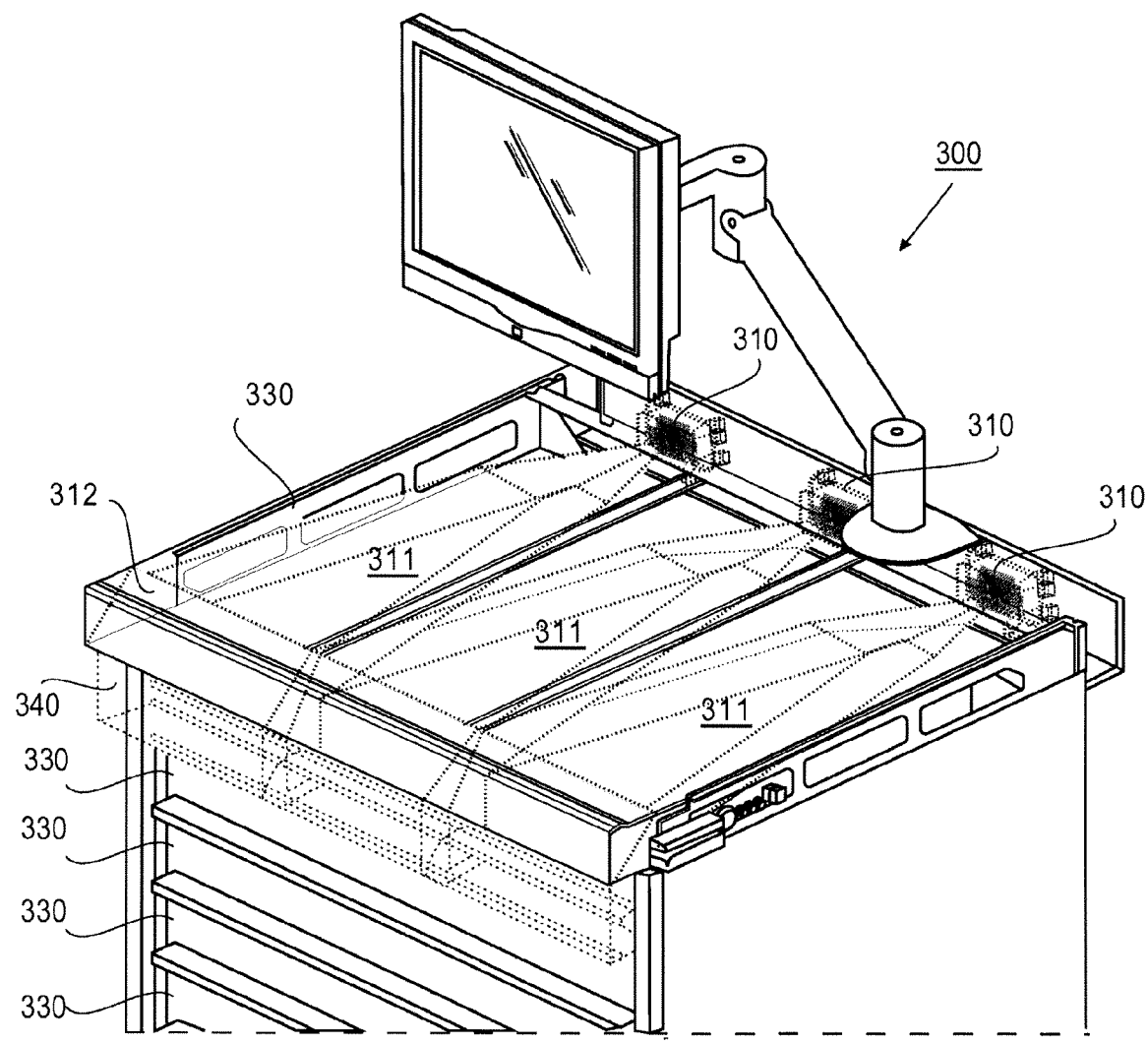

FIGS. 4a and 4b show a partial perspective view of tool storage system 300. As illustrated in FIG. 4a, an access control device 306 in the form of a card reader is disposed on a side surface of the system. Storage system 300 includes an imaging compartment 330 which houses an image sensing device comprising three cameras 310 and a light directing device, such as a mirror 312 having a reflection surface disposed at about 45 degrees downwardly relative to a vertical surface, for directing light reflected from drawers 330 to cameras 310. The directed light, after arriving to cameras 310, allow cameras 310 to form images of drawers 330. The shaded area 340 below mirror 312 represents a viewing field of the imaging sensing device of tool storage system 300. Mirror 312 has a width equal to or larger than that of each storage drawer, and redirects the camera view downwards toward the drawers. FIG. 4e is an illustrative side view of system 300 showing the relative position between cameras 310, mirror 312 and drawers 330. Light L reflected from any of drawers 330 to mirror 312 is directed to cameras 310.

FIG. 4b is a perspective view identical to FIG. 4a except that a cover of imaging compartment 330 is removed to reveal details of the design. Each camera 310 is associated with a viewing field 311. As shown in FIG. 4b, the combined viewing fields of cameras 310 form the viewing field 340 of the image sensing device. Viewing field 340 has a depth of x. For instance, the depth of viewing field 340 may be approximately 2 inches.

Figure 4C:
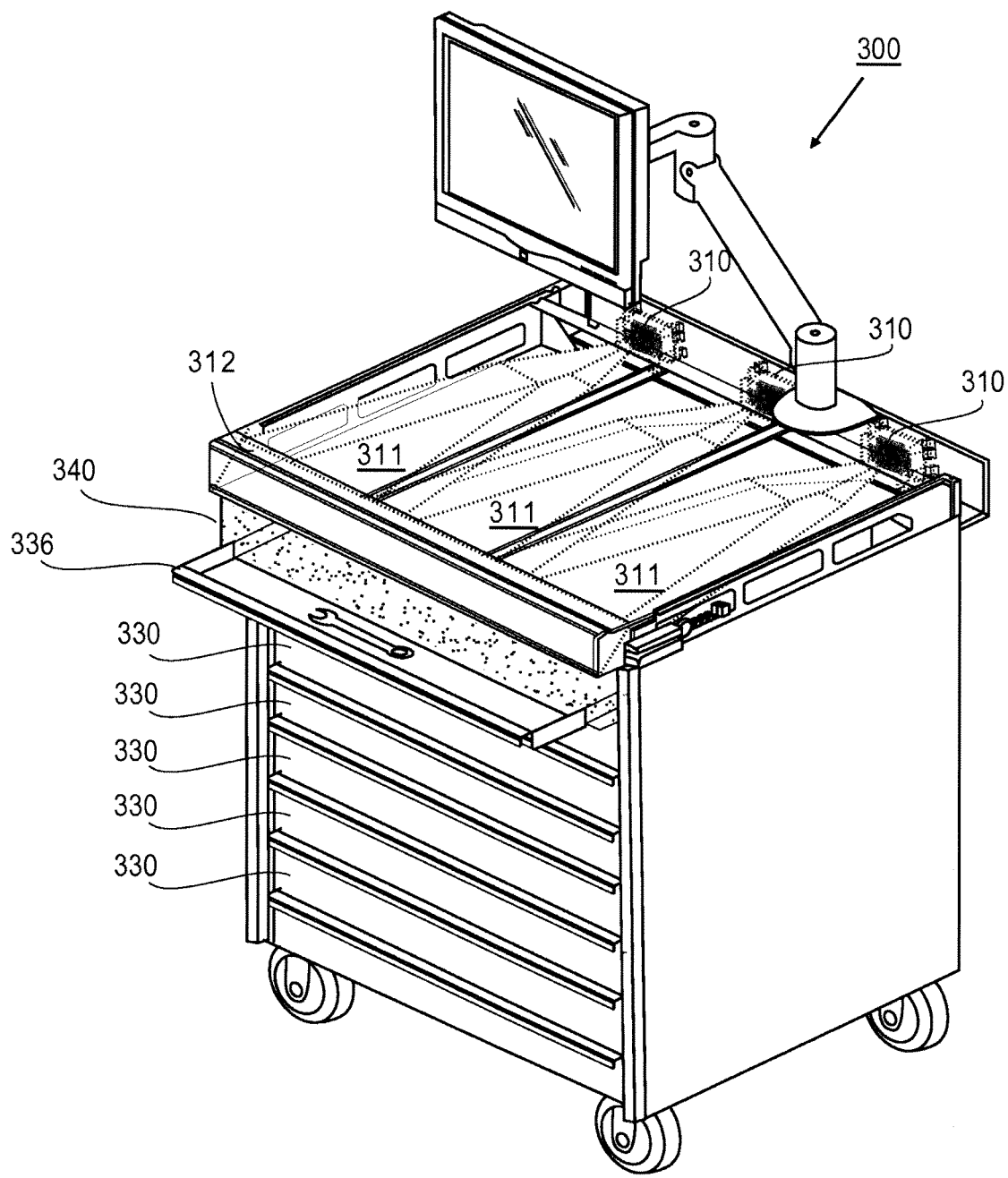
Figure 4E:
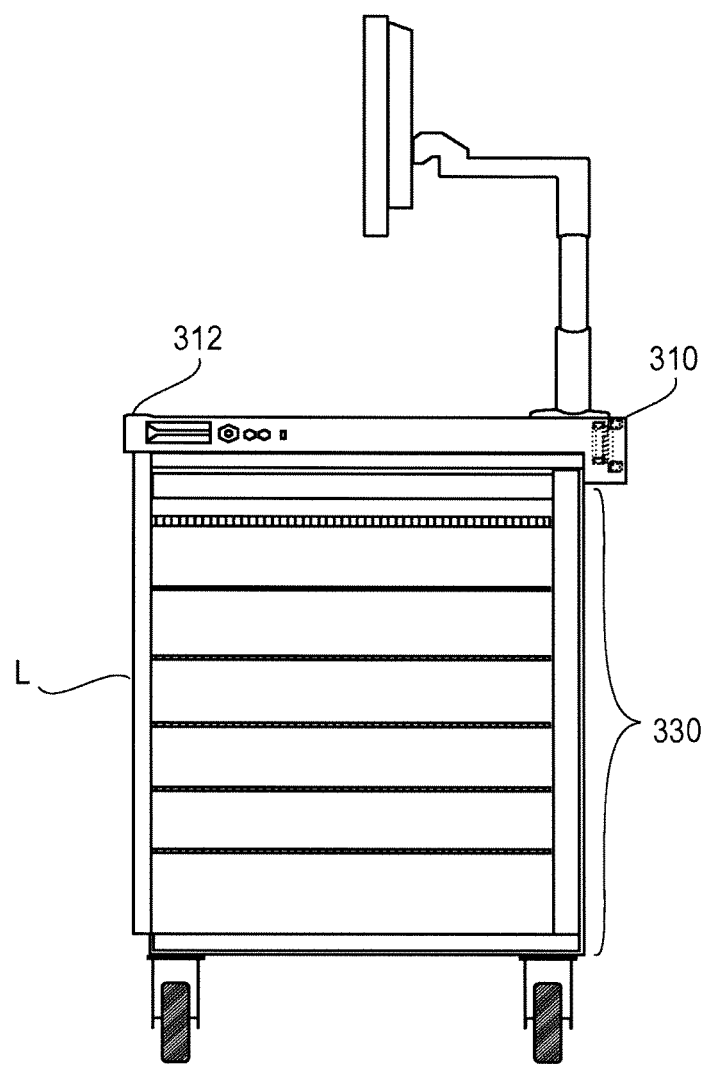

FIG. 4c is an alternative perspective view of tool storage system 300 shown in FIG. 4a, except that a storage drawer 336 now operates in an open mode allowing partial access to its contents or storage locations in storage drawer 336.

This arrangement of cameras 310 and mirror 312 in FIGS. 4a-4c allows cameras 310 the capability of capturing images from the top drawer to the bottom drawer, without the need to substantially change its focal length.

In one embodiment, cameras 310 capture multiple partial images of each storage drawer as it is opened or closed. Each image captured by cameras 310 may be associated with a unique ID or a time stamp indicating the time when the image was captured. Acquisition of the images is controlled by a data processor in tool storage system 300. In one embodiment, the captured images are the full width of the drawer but only approximately 2 inches in depth. The captured images overlap somewhat in depth and/or in width. As shown in FIG. 4D, the partial images 41-45 taken by different cameras 310 at different points in time may be stitched together to form a single image of partial or entire drawer and its contents and/or storage locations. This stitching may be performed by the data processor or by an attached or remote computer using off-the-shelf software programs. Since images are captured in approximately two inch slices multiple image slices are captured by each camera. One or more visible scales may be included in each drawer. The processor may monitor the portion of the image that contains the scale in a fast imaging mode similar to video monitoring. When the scale reaches a specified or calculated position, the data processing system controls the image sensing device to capture and record an image slice. The scale may also assist in photo stitching. Additionally a pattern such as a grid may be applied to the surface the drawer. The pattern could be used to assist the stitching or image capture process.

In another embodiment, the image sensing device includes larger mirrors and cameras with wide angle lens, in order to create a deeper view field x, such that the need for image stitching can be reduced or entirely eliminated.

In one embodiment, one or more line scan cameras are used to implement the image sensing device. A line scan camera captures an image in essentially one dimension. The image will have a significant width depending on the sensor, but the depth is only one pixel. A line scan camera captures an image stripe the width of the tool drawer but only one pixel deep. Every time drawer 330 moves by a predetermined partial amount the camera will capture another image stripe. In this case the image stripes must be stitched together to create a usable full drawer image. This is the same process used in many copy machines to capture an image of the document. The document moves across a line scan camera and the multiple image stripes are stitched together to create an image of the entire document.

In addition to a mirror, it is understood that other devices, such as prisms, a combination of different types of lens including flat, concave, and/or convex, fiber optics, or any devices may direct light from one point to another may be used to implement the light directing device for directing light coming from an object to a remote camera. Another option could be the use of fiber optics. The use of light directing device may introduce distortions into the captured images. Calibrations or image processing may be performed to eliminate the distortions. For instance, cameras 310 may first view a known simple grid pattern reflected by the light directing device and create a distortion map for use by the data process processor to adjust the captured image to compensate for mirror distortion.

For better image capture and processing, it may be desirable to calibrate the cameras. The cameras may include certain build variations with respect to image distortion or focal length. The cameras can be calibrated to reduce distortion in a manner similar to how the mirror distortion can be reduced. In fact, the mirror calibration could compensate for both camera and mirror distortion, and it may be the only distortion correction used. Further, each individual cameras may be calibrated using a special fixture to determine the actual focal length of their lenses, and software can be used to compensate for the differences from camera to camera in a single system.

In one embodiment, the image sensing device does not include any mirror. Rather, one or more cameras are disposed at the location where mirror 312 was disposed. In this case, the cameras point directly down at storage drawers 330 when then move. In another embodiment, each storage drawer 330 has one or more associated cameras for capturing images for that storage drawer.

Determination of Inventory Conditions

System 300 determines the presence or absence of tools in drawers 330 based on captured images using a variety of possible strategies. Suitable software may be executed by the embedded processor or an attached computer (PC) for performing inventory determinations based on captured images.

In one example, system 300 determines an inventory condition of a storage drawer based on empty locations in the drawer. Each storage location in the drawer is configured to store a pre-designated object, such as a pre-designated tool. A non-volatile memory device of system 300 stores information identifying a relationship between each known storage location in the drawer and its corresponding pre-designated object. The memory device also stores information of a baseline image of the drawer having each of its storage locations occupied by the corresponding pre-designated object. In determining an inventory condition of the drawer, the data processor compares an image of the drawer and the baseline image. Based on a difference of the images, the data processor determines which storage location in the drawer is not occupied by its corresponding pre-designated object. The identify of the missing object is determined based on the stored relationship identifying each storage locations and their corresponding pre-designated objects.

In another embodiment, the baseline image includes an image with all storage locations in a drawer unoccupied by their corresponding pre-designated objects. Based on a comparison of the captured image and the baseline image, system 300 determines which storage location have corresponding pre-designated objects and which locations do not. Missing objects may be determined based on the stored relationship identifying each storage locations and their corresponding pre-designated objects.

In still another embodiment, the baseline image has some storage locations occupied by their respective pre-designated objects, while other locations are not occupied by their respective pre-designated objects. A non-volatile memory device of system 300 stores information identifying a relationship between each known storage location in the drawer and its corresponding pre-designated object, and information on which locations are or are not occupied by their corresponding pre-designated objects. The system compares a captured image of a drawer with the baseline image, and determines a difference. Based on the determined difference and the information on which locations are or are not occupied by their corresponding pre-designated objects, system 300 determines which storage location have corresponding pre-designated objects and which locations do not. Missing objects may be determined based on the stored relationship identifying each storage locations and their corresponding pre-designated objects.

Another embodiment according to this disclosure utilizes specially designed identifier for determining an inventory condition of objects. Depending on whether a storage location is being occupied by an object, an associated identifier appears in one of two different manners in an image captured by the image sensing device. For instance, an identifier may appear in a first color when the associated storage location is occupied by a tool and a second color when the associated storage location is unoccupied. The identifiers may be texts, one-dimensional or two-dimensional bard code, patterns, dots, code, symbols, figures, numbers, LEDs, lights, flags, etc., or any combinations thereof. The different manners that an identifier may appear in an image captured by the image sensing device include images with different patterns, intensities, forms, shapes, colors, etc. Based on how each identifier appears in a captured image, the data processor determines an inventory condition of the object.

FIG. 5 shows an embodiment of identifier designs. As shown in FIG. 5, storage location 51 is designated to store tool 510, and storage location 52 is currently occupied by its designated tool 520. Storage location 53 is not occupied by its designated tool. Each storage location 51, 52, 53 has an associated identifier. Depending on whether each storage location 51-53 is being occupied by a corresponding tool, each identifier appears in an image captured by cameras 310 in one of two different manners. For example, each identifier may not be viewable by cameras 310 when a corresponding tool is stored in the respective storage location, and becomes viewable by cameras 310 when an object is not stored in the respective storage location. Similarly, a different embodiment may have an identifier viewable by the image sensing device when an object is stored in the respective storage location, and is not viewable by the image sensing device when an object is not stored in the respective storage location.

For instance, the bottom of storage locations 51-53 includes an identifier made of retro-reflective material. Since storage locations 51 and 53 are not occupied by their respective designated tools, their associated identifiers 511 and 513 are viewable to the image sensing device. On the other hand, storage location 52 is currently occupied by its designated tool, its identifier is blocked from the view of the image sensing device. When the particular tool is stored in the storage location, the identifier is blocked from the view of the image sensing device and not viewable by the image sensing device. On the other hand, if the storage location is not occupied by the particular tool, the identifier is viewable by the image sensing device and shows up as a high intensity area on an image of the drawer. Accordingly, a high intensity area represents a missing tool. The system 300 detects locations with missing tools and correlates the empty locations with stored relationship identifying each storage locations and their corresponding tools. The system 300 determines which tools are not in their specified locations in a drawer. It is understood that the identifiers may be implemented in many different manners. For instance, the identifiers may be designed to create a high intensity image when a storage location is occupied and an image with less intensity when the storage location is occupied.

In one embodiment, each identifier is implemented with a contact sensor and an LED. As shown in FIG. 5b, storage location 61 is associated with a contact sensor 62 and an LED 63. When contact sensor 61 senses a tool is in storage location

61, a signal is generated by contact sensor 61 and controls to turn off power supply to LED 63. On the other hand, if contact sensor 62 detects that a tool is not in storage location 61, control sensor 62 generates a control signal which controls to turn on LED 63, which creates a high intensity area in an image captured by the image sensing device. Each high intensity area in an image indicates a storage location without an associated tool. The system 300 identifies removed or missing tools by determining which storage locations are not occupied by tools and pre-stored information identifying corresponding tools of the locations. In still another embodiment, the identifier is unique to the pre-designated tool stored in each respective storage location. The data processor is configured to determine an inventory condition by evaluating whether at least one viewable identifier exists in an image of the storage locations captured by the image sensing device, and pre-stored relationship between each pre-designated object and a respective identifier unique to each pre-designated object.

In still another embodiment, an identifier associated with a storage location creates a high intensity image when the storage location is occupied, and a lower intensity image when the storage location is unoccupied. The system 300 determines which tools exist based on detected identifiers and pre-stored information identifying a relationship between each storage location and the corresponding pre-designated object. In another embodiment, the identifier is unique to a pre-designated object stored in each respective storage location. The system 300 determines an inventory condition of existing objects by evaluating identifiers that exist in an image of the storage locations captured by the image sensing device, and pre-stored relationship between each pre-designated object and a respective identifier unique to each pre-designated object.

In still another embodiment, each object stored in the system 300 includes an attached identifier unique to each object. The data processor has access to prestored information identifying each tool stored in the system and known information identifying a relationship between each object and a respective identifier unique to each pre-designated object. The data processor determines an inventory condition of objects by evaluating identifiers that exist in an image of the storage locations captured by the image sensing device, and the relationship between each pre-designated object and a respective identifier unique to each pre-designated object. For instance, system 300 stores a list of tools stored in the system and their corresponding unique identifiers. After cameras 310 captures an image of a storage drawer, the data processor determines which identifier or identifiers are in the image. By comparing the identifiers appearing in the image with list of tools and their corresponding unique identifiers, the data processor determines which tools are in the system and which ones are not.

As discussed earlier, identifiers associated with the storage locations may be used to determine which locations have missing objects. According to one embodiment, system 300 does not need to know the relationship between each storage location and the corresponding object. Rather, each identifier is unique to a corresponding object stored in the storage location. The data processor of system 300 has access to pre-stored information identifying a relationship between each identifier and the corresponding object, and information identifying each object. In other words, system 300 has access to an inventory list of every object stored in system 300 and its respective unique identifier. When an empty tool storage location is detected by system 300, the corresponding identifier is extracted from the image and decoded by system software. As each identifier is unique to a corresponding object, system 300 is able to determine which object is missing by checking the relationship between each identifier and the corresponding object, and the inventory list of objects. Each identifier unique to an object stored in a storage location may be disposed next to the storage location or in the storage location. In one embodiment, the identifier is disposed next to the storage location and is always viewable to the image sensing device no matter whether the location is occupied by an object or not. In another embodiment, when an identifier is disposed in the corresponding location, the identifier is not viewable to the image sensing device when the location is occupied by an object, and is viewable to the image sensing device when the location is not occupied by an object.

An embodiment of this disclosure utilizes combinations of baseline images and identifiers unique to objects to determine an inventory status. For example, a baseline image may include information of a storage drawer with all storage locations occupied with their respective corresponding objects, wherein each storage location is associated with an identifier unique to an object stored in the storage location. An inventory condition is determined by comparing an image of the storage locations and the baseline image, to determine which locations are occupied by objects and/or which locations have missing objects. Identifications of the missing objects are determined by identifying the identifier associated with each storage location with missing object.

Another embodiment of this disclosure utilizes unique combinations of identifiers to determine an inventory status. For instance, each storage location may have a first type of identifier disposed in the location and a second type of identifier unique to an object stored in the storage location and disposed next to the storage location. The first type of identifier is viewable to an image sensing device when the location is not occupied by an object and not viewable by an image sensing device when the location is occupied by an object. The first type of identifier may be made of retro-reflective material. If a storage location is not occupied by an object corresponding to the storage location, the identifier of the first type is viewable by the image sensing device and shows up as a high intensity area. Accordingly, each high intensity area represents a missing object, which allows system 300 to determine which locations having missing objects. Based on identifiers of the second type associated with those locations with missing objects, system 300 identifies which objects are missing from system 300. Consequently, an inventory condition of system 300 is determined.

According to still another embodiment, system 300 uses image recognition methods to identify an object missing from system 300. System 300 has access to an inventory list indicating which tools are stored in each drawer or system 300. However, system 300 does not have to know where the tools are stored. The tools are placed in foam cutout locations specific for each tool. Using characteristics such as size, shape, color, and other parameters image recognition software identifies each tool in the drawer. Missing tools are simply the tools on the inventory list that are not identified as being in the drawer.

System 300 records access information related to each access. The access information includes time, user information related to the access, duration, user images, images of storage locations, identities of storage units or contents of the storage system, objects in the storage system, etc., or any combinations thereof. In one embodiment, system 300 includes a user camera that captures and stores image of the person accessing storage system 300 each time access is authorized. For each access by a user, system 300 determines an inventory condition and generates a report including associating the determined inventory condition with access information.

Timed Image Capturing

Embodiments of this disclosure utilize uniquely timed machine imaging to capture images of system 300 and determine an inventory condition of system 300 according to the captured images. In one embodiment, system 300 activates or times imaging of a storage drawer based on drawer locations and/or movements, in order to create efficient and effective images. For instance, a data processor of the system 300 uses drawer positions to determine when to take overlapping partial images as discussed relative to FIGS. 4a-4e, to assure full coverage of a drawer being accessed by a user. In another example, drawer position information may be useful to the stitching software in the construction of a full drawer image. Drawer position information may be used to help locate the positions of the cutouts in the drawer.

In one embodiment, the data processor of system 300 controls the image sensing device to form images of a drawer based on a pre-specified manner of movement by the drawer. For instance, for each access, system 300 only takes images of the drawer when it is moving in a specified manner or in a predetermined direction. According to one embodiment, the image sensing device takes images when a drawer is moving in a direction that allows decreasing access to its contents or after the drawer stops moving in the direction allowing decreasing access to its contents. For example, cameras may be controlled to take pictures of drawers when a user is closing a drawer, when or after a drawer stops moving in a closing direction or when the drawer is completely closed. In one embodiment, no images are taken when the drawer is moving in a direction allowing increasing access to its contents, such as when a drawer moves from a close position to an open position.

Figure 6C:
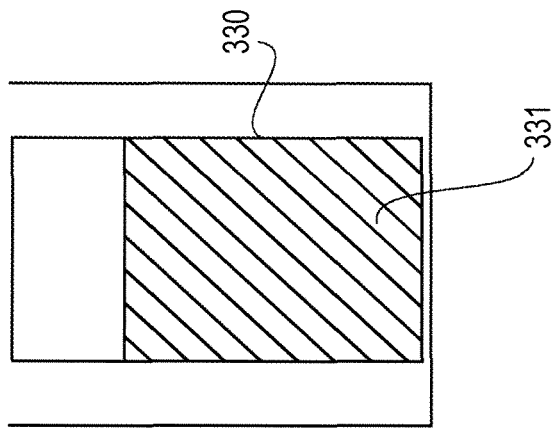
FIGS. 6A, 6B, and 6C illustrate examples of timed image capturing.
Figure 6B:
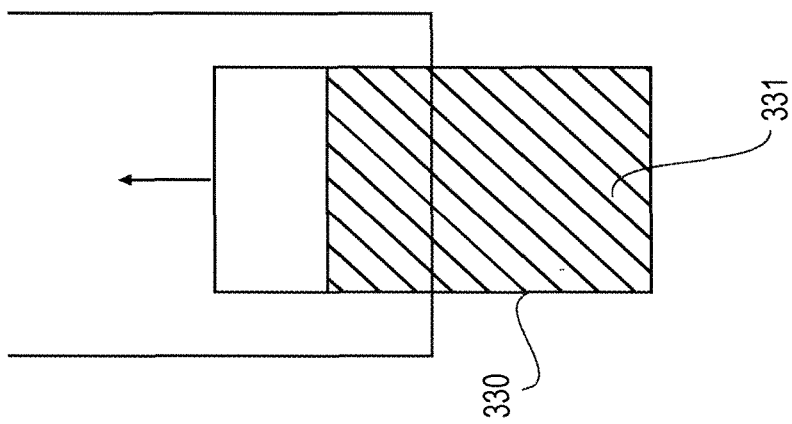
Figure 6A:
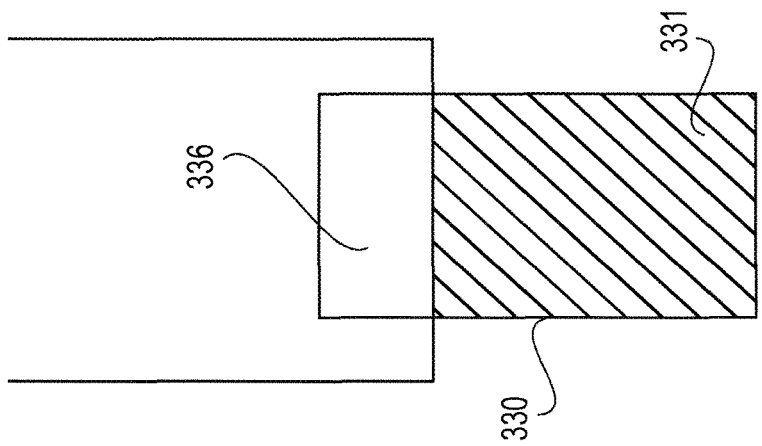

FIG. 6 shows an operation of this embodiment in the setting of an exemplary system described in FIGS. 4a-4d. As shown in FIG. 6a, a user partially opens drawer 330 to expose storage locations in shaded area 331. Since the user only opens drawer 330 half way, the user has no access to storage locations in area 336. After the user finds the tool he needs from area 331, the user starts to close drawer 330 (FIG. 6b). When sensors in system 300 detect the closing movement of drawer 330, which allows decreasing access to contents, the data processor activates the image sensing device, such as cameras 310, to capture partial images of shaded area 331 until drawer 330 is fully closed (FIG. 6c). Since the user never has any access to area 336, it is safe to assume that an inventory condition relative to area 336 remains unchanged from the previous access. However, for area 331, since the user had access to that area, an inventory associated with that area needs to be updated. Any changes in access or replacement of tools would occur only in area 331. Therefore, system 300 determines an inventory condition of drawer 330 associated with the access by the user based on the captured image covering area 331 and inventory information related to area 336 of a previous access, the information of which may be retrieved from a non-volatile memory device of system 300 that stores inventory information associated with each access to system 300. The determined inventory condition for drawer 330 is then stored in the non-volatile memory device. In one embodiment, the non-volatile memory device stores an initial inventory condition of drawer 300 which represents a baseline inventory condition with which later inventory conditions may compare. For instance, after each auditing of tool inventory condition, system 300 stores the inventory condition after the audit as the baseline inventory condition.

Locations, movements and moving directions of each storage drawer may be determined by using sensors to measure location or movement sensors relative to time. For instance, location information relative to two points in time may be used to derive a vector indicating a moving direction.

Examples of sensors for detecting a position, movement or moving direction of storage drawers include a sensor or encoder attached to a drawer to detect its position relative to the frame of system 300; a non-contact distance measuring sensor for determining drawer movement relative to some position on the frame of the system 300, such as the back of the system 300; etc. Non-contact sensors may include optical or ultrasonic sensors. A visible scale or indicator viewable by cameras 310 may be included in each drawer, such that camera 210 could read the scale to determine drawer position.

A change in an inventory condition, such as removal of tools, occurring in the current access may be determined by comparing inventory conditions of the current access and the access immediately before the current access. If one or more objects are missing, system 300 may generate a warning signal, such as audible or visual, to the user, generate a notice to a remote server coupled to system 300, etc.

In another embodiment, the image sensing device is configured to form images of the storage locations both when storage drawer 330 moves in a direction allowing increasing access to its contents, and when storage drawer 330 subsequently moves in a direction allowing decreasing access to its contents. For example, when a user opens drawer 330 to retrieve tools, the moving direction of drawer 330 triggers cameras 310 to capture images of drawer contents when it moves. The captured image may be designated as a "before access" image representing a status before a user has accessed the contents of each storage drawer. An inventory condition is determined based on the captured images. This inventory condition is considered as a "before access" inventory condition. Cameras 310 stops capturing images when drawer 330 stops moving. When the user closes drawer 330, the moving direction of drawer 330 triggers cameras 310 to capture images of drawers 330 again until it stops or reaches a close position. An inventory condition of the drawer is determined based on images captured when the user closes drawer 330. This determined inventory condition is designated as an "after access" inventory condition. A difference between the before access inventory condition and the after access inventory condition indicates a removal or replacement of tools. Other embodiments of this disclosure control cameras to take the "before access" image before a storage drawer is opened or after the storage drawer is fully opened or when its contents are accessible to a user. According to another embodiment, the image sensing device is timed to take an image of each drawer 330 when it was detected that access by a user is terminated. As used herein in this disclosure, terminated access is defined as a user no longer having access to any storage locations, such as when drawer 330 is closed or locked, when door 250 is closed or locked, etc., or an indication by the user or the system that access to the storage system is no longer desired, such as when a user signs off, when a predetermined period of time has elapsed after inactivity, when a locking device is locked by a user or by system 300, etc. For each access, a position detector or contact sensor is used to determine whether drawer 330 is closed. After the drawer is closed, the image sensing device captures an image of drawer 330. The data processing system then determines an inventory condition based on the captured image or images. A difference in the inventory condition may be determined by comparing the determined inventory condition of the current access to that of the previous access.

Figure 7A:
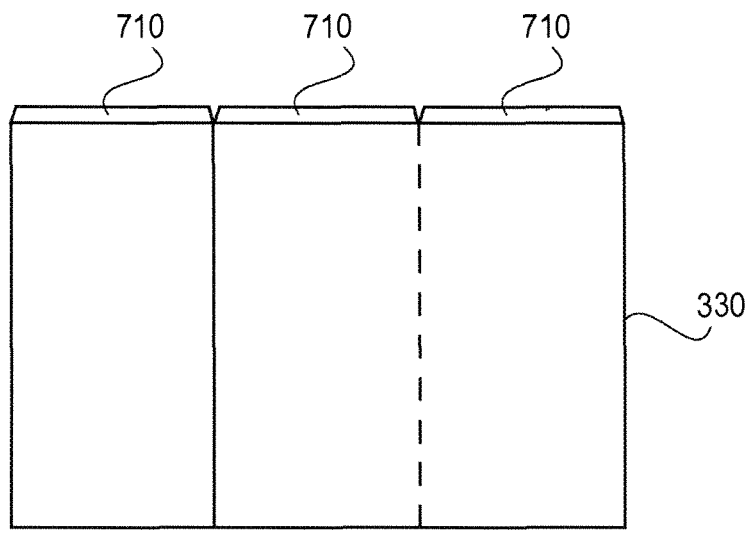
FIGS. 7a and 7b are different views of another embodiment of camera designs.
Figure 7B:
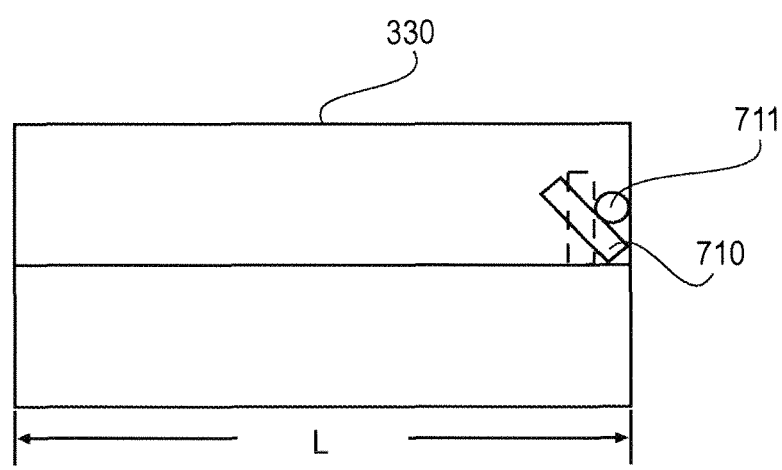

FIGS. 7a and 7b show an exemplary drawer having cameras configured to capture images of the drawer when it is closed. FIG. 7a is a top view of a drawer 330 having three cameras 770. Cameras 770 have sufficient widths of viewing fields to cover the entire width of drawer 330. FIG. 7b is a side view of drawer 330 shown in FIG. 7a. Camera 710 tilts down a specific angle and has a sufficiently large viewing field to cover the entire length L of drawer 330. In one embodiment, cameras 710 does not have to cover the entire length L with one image. Rather, camera 710 may be rotatably attached to a hinge 711, which allows camera to tilt up and down vertically, to cover different sections of drawer 330. Images captured by cameras 710 are stitched or combined to form an image of the entire drawer.

It is understood that other camera configurations or designs may be utilized to capture images of drawer 330 when it is closed. In one embodiment, one or more moving cameras are used to capture images of a drawer after it is closed. In this embodiment, the cameras are configured to move over the drawer and capture image slices that can be stitched together to create a full drawer images. The cameras may be moved by a motor along a rail. Either 2D or line scan cameras can be used in this model. A sensor may be used to determine the location of the cameras to assist in stitching or other functions such as camera position control. A variation of this model uses a stationary camera for each drawer viewing across the top of the drawer and a 45 degree moving mirror that moves over the draw and redirects the camera view towards the drawer. Another variation is to provide a camera moving from one drawer to another. Still another variation is to provide a moving mirror for each drawer and one or more cameras moving between drawers. The movements of the cameras and mirrors are synchronized to form images of each storage drawer. The cameras and drawers may be driven by motors or any means that provide power.

If the image sensing device requires illumination to obtain acceptable image quality, illumination devices may be provided. For example, LEDs may be used to illuminate the image area. It is understood that other illumination sources may be used. In one embodiment, LEDs are disposed surrounding the lens or image sensors of the camera and light is transmitted along the same path as the camera view. In an embodiment including the use of a light directing device, such as a mirror, the emitted light would be directed by the mirror towards the drawers. The timing and intensity of the illumination is controlled by the same processor that controls the camera and its exposure. In some possible configurations of cameras it may be desirable to implement background subtraction to enhance the image. Background subtraction is a well known image processing technique use to remove undesirable static elements from an image. First an image is captured with illumination off. Then a second image is captured with illumination on. The final image is created by subtracting the illumination off image from the illumination on image. Image elements that are not significantly enhanced by the illumination are thereby removed from the resulting image.

According to another embodiment, for each access, the image sensing system 300 is timed to capture at least two images of drawer 300: at least one image (initial image) captured before a user has access to storage locations in drawer 300 and at least one image captured after the access is terminated, as discussed earlier. The initial image may be taken at any time before the user has access to the contents or storage locations in the drawer. In one embodiment, the initial image is captured when or after a user requests access to system 300, such as by sliding a keycard, punching in password, inserting a key into a lock, providing authentication information, etc. In another embodiment, the initial image is captured before or in response to a detection of drawer movement from a close position or the unlock of a locking device of system 300.

The data processing system of system 300 determines an inventory condition based on the initial image, and assigns the determined inventory condition as "before access" inventory condition; and determine an inventory condition based on the image captured after the access is terminated and designated the determined inventory condition as "after access" inventory condition. A change in the inventory condition of objects in system 300 may be determined based on a comparison of the "before access" and "after access" inventory conditions or a comparison of the initial image and the image captured after the access is terminated.

Concepts and designs described above may be applicable to other types of storage systems, such as a type shown in FIG. 1B, where a single door controls the access to multiple shelves or drawers. In one embodiment, the image sensing device may be timed to capture images of the storage locations when or after a detected termination of access, such as closing door 250, locking door 250, signing out, etc. It is understood that various types of sensors, such as contact sensors, infrared sensors, may be used to determine when a door is closed. Similar to the discussions earlier, the image sensing device captures images of the storage locations, and determine an "after access" inventory condition based on the captured image. A change in the inventory condition related to the access by comparing an inventory condition of the current access and that of the last access. According to another embodiment, the image sensing device is timed to take "before access" images of the storage locations before a user has access to the storage system. For instance, the cameras may be timed to capture images of the storage locations when or after a user requests access to the system, after detecting an opening of door 250, after receiving authentication information from a user, etc. The storage system determines a "before access" inventory condition based on the "before access" image. A change in the inventory condition may be determined according to a difference between the "before access" and "after access" inventory conditions, or a difference between the "before access" and "after access" images.

Networked Storage Systems

Figure 8:
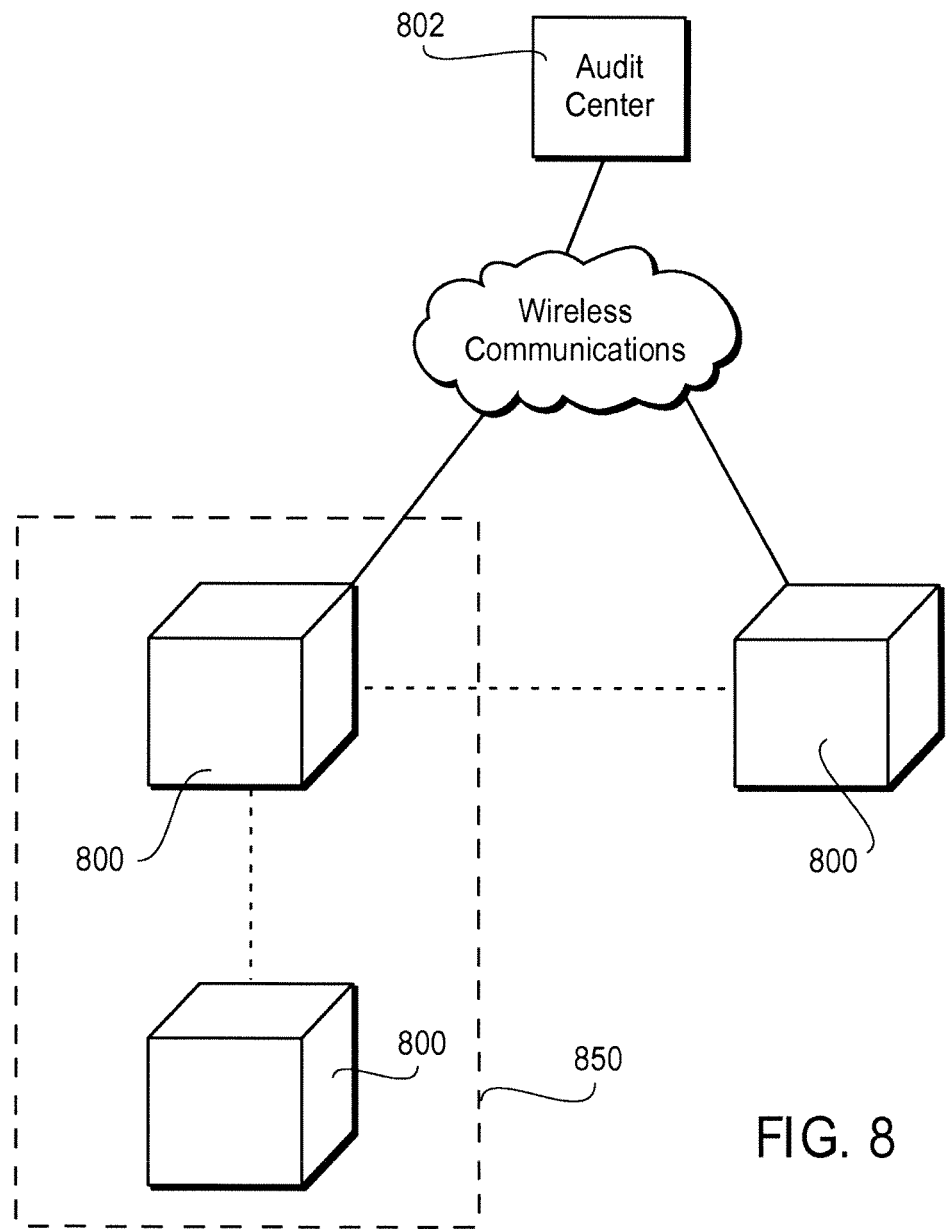
FIG. 8 is a block diagram of an exemplary networked inventory control system.

Storage systems described in this disclosure may be linked to a remote server in an audit center, such that inventory conditions in each storage system is timely updated and reported to the server. As shown in FIG. 8, a server 802 is coupled to multiple storage systems 800 via a wireless network. Server 802 may include a database server, such as a Microsoft SQL server. Information related to authentication, authorized users, inventory conditions, audit trails, etc., is stored in the database.

In one embodiment, each storage system 800 is provided with a data transceiver, such as an 802.11g or Ethernet module. The Ethernet module connects directly to the network, while a 802.11g module may connect through a 802.11g router connected to the network. Each of these network modules will be assigned a static or dynamic IP address. In one embodiment, storage systems 800 check in to the server through the data transceivers on a periodic basis, to download information about authorized users, authorization levels of different users or different keycards, related storage systems, etc. Storage systems 800 also upload information related to the systems such as inventory conditions, drawer images, tool usage, access records, information of user accessing storage systems 800, etc., to server 802. Each storage system 800 may be powered by an AC source or by a battery pack. An uninterruptible power supply (UPS) system may be provided to supply power during a power failure.

Server 802 allows a manager or auditor to review access information related to each storage system 800, such as inventory conditions and information related to each access to storage system 800 like user information, usage duration, inventory conditions, changes in inventory conditions, images of drawers or contents of the storage system, etc. In one embodiment, server 802 may form a real time connection with a storage system 800 and download information from that storage system. The manager or auditor may also program the access control device on each storage system through server 802, such as changing password, authorized personnel, adding or deleting authorized users for each storage system, etc. Authorization data needed for granting access to each storage system 800 may be programmed and updated by server 802 and downloaded to each storage system 800. Authorization data may include passwords, authorized personnel, adding or deleting authorized users for each storage system, user validation or authentication algorithm, public key for encryptions and/or decryptions, black list of users, white list of users, etc. Other data updates may be transmitted to each storage system from server 802, such as software updates, etc. Similarly, any changes performed on storage system 800, such as changing password, adding or deleting authorized users, etc., will be updated to server 802.

For each access request submitted by a user, a storage system authenticates or validates the user by determining a user authorization according to user information input by the user via the data input device and the authorization data. According to a result of the authentication, the data processor selectively grants access to the storage system by controlling an access control device, such as a lock, to grant access to the storage system 800 or one or more storage drawers of one or more storage systems 800.

Server 802 also allows a manager to program multiple storage systems 800 within a designated group 850 at the same time. The manager may select which specific storage systems should be in group 850. Once a user is authorized access to group 850, the user has access to all storage systems within group 850. For instance, a group of storage systems storing tools for performing automotive service may be designated as an automotive tool group, while another group of storage systems storing tools for performing electrical work may be designated as an electrical tool group. Any settings, adjustments or programming made by Server 802 in connection with a group automatically apply to all tool storage systems in that group. For instance, server 802 may program the tool storage systems by allowing an automotive technician to access all tool storage systems in the automotive tool group, but not those in the electrical tool group. In one embodiment, each system 800 only includes minimal intelligence sufficient for operation. All other data processing, user authentication, image processing, etc., are performed by server 802.

Similarly, server 802 also allows a manager to program multiple storage drawers 330 within a designated group at the same time. The manager may select which specific storage drawers, of the same system or different storage systems, should be in the group. Once a user is authorized access to the group, the user has access to all storage drawers within the group. For instance, a group of storage systems storing tools for performing automotive tools may be designated as an automotive tool group, while another group of storage systems storing tools for performing electrical work may be designated as an electrical tool group.

In another embodiment, an exemplary networked storage system as shown in FIG. 8 utilizes hierarchical authorization architecture to manage access to storage systems. One or more storage systems 800 are given the status of master storage system. Each master storage system has one or more associated slave storage systems. If a user is authorized to access to a master storage system, the same user is automatically authorized to access any slave storage system associated with that master system. On the other hand, if a user is authorized to access a slave storage system, the authorization to the slave system does not automatically grant the user access to its associated master storage system or other slave storage systems associated with the same master storage system.

According to still another embodiment, an exemplary networked storage system as shown in FIG. 8 grants user access by utilizing multiple hierarchical authorization levels. Each authorization level is associated with pre-specified storage systems, which can be programmed by a manager via server 802. When a user is assigned a specific authorization level, this user is authorized to access all storage systems associated with the assigned authorization level and all storage systems associated with all authorization levels lower than the assigned authorization level in the authorization hierarchy, but not to those associated with authorization levels higher than the assigned authorization level in the authorization hierarchy.

Audit

An exemplary inventory control system according to this disclosure tracks various types of information related to each access. For example, system 800 records date, time and/or duration for each access, and corresponding user information submitted by a user to obtain access to system 800. As discussed earlier, system 800 captures one or more images of the storage unit during each access for determining an inventory condition. The images are linked to each access and accessing user and stored in system 800. System 800 may store the information locally or upload the obtained information to server 802 via the wireless communication network, as shown in FIG. 8.

Server 802 may process and compile the information received from each system 800, to create an audit trail for each server 802. The audit trail is accessible by managers or users with suitable authorization levels. Different types of audit trails may be generated and retrieved based on preference of authorized users. For instance, an audit trail may be generated for one or more specific dates, one or more specific users, one or more specific tools, one or more IDs, etc. Additional information and analysis may be generated and provided by server 802. For example, system 802 may track usages of a specific tool over time, and generate a report summarizing a usage frequency for each tool for evaluation. Such report may be used to determine what tools are used more frequently and which tools probably are not needed because they are used less often than others.

FIG. 9a shows an exemplary screen of an audit trail with respect to a specific storage system 800. Each access to system 800 is identified by Date/Time 920 and user information 910 of users associated with each access. User information may include any information submitted by a user when requesting access to system 800, such as finger prints, facial recognition images, user images taken by user cameras, passwords, information stored in keycards, any information for authentication, etc. In one embodiment, data of user facial characteristics of each user is stored in system 800 or server 802. For each access, an image of a user accessing system 800 is captured by a user camera. User information submitted by the user for gaining access to system 800, such as information stored in a keycard and/or password, is collected. The captured image is compared against user facial characteristics of a user identified by the user information. System 800 or server 802 determines whether the facial characteristics of the user accessing system 800 matches facial characteristics of the user identified by the user information.

Figure 9B:
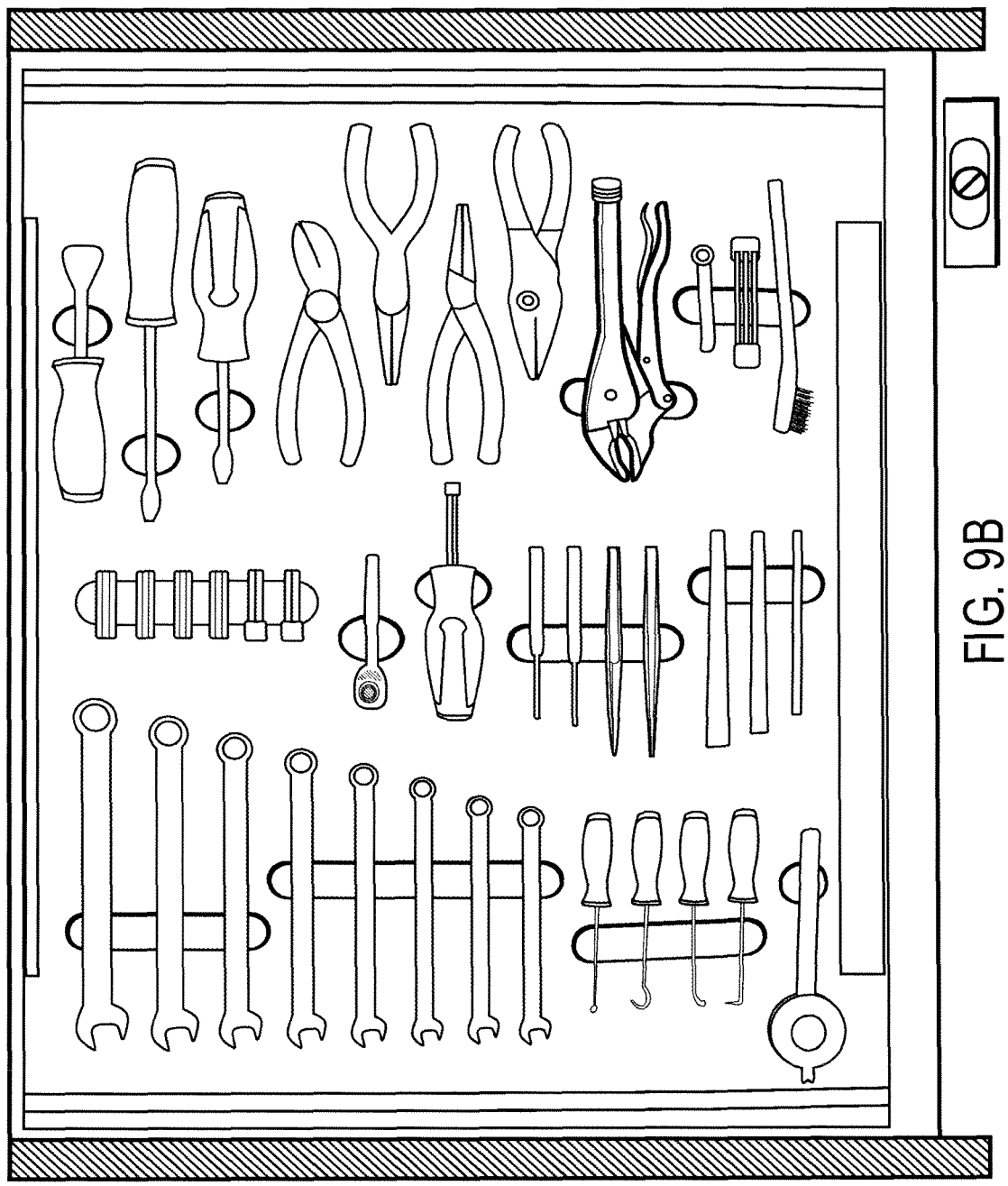
Figure 9C:
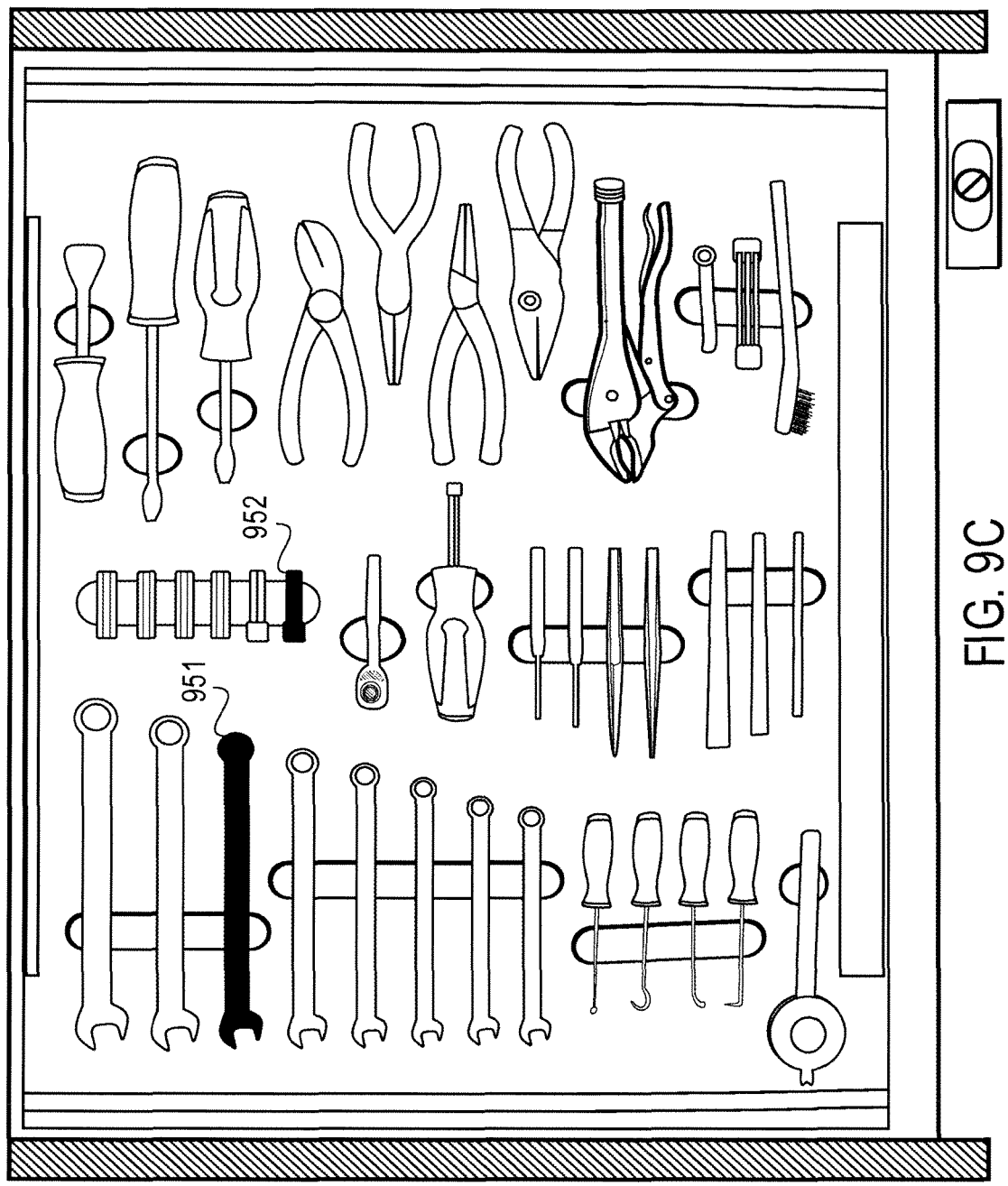
Figure 9D:
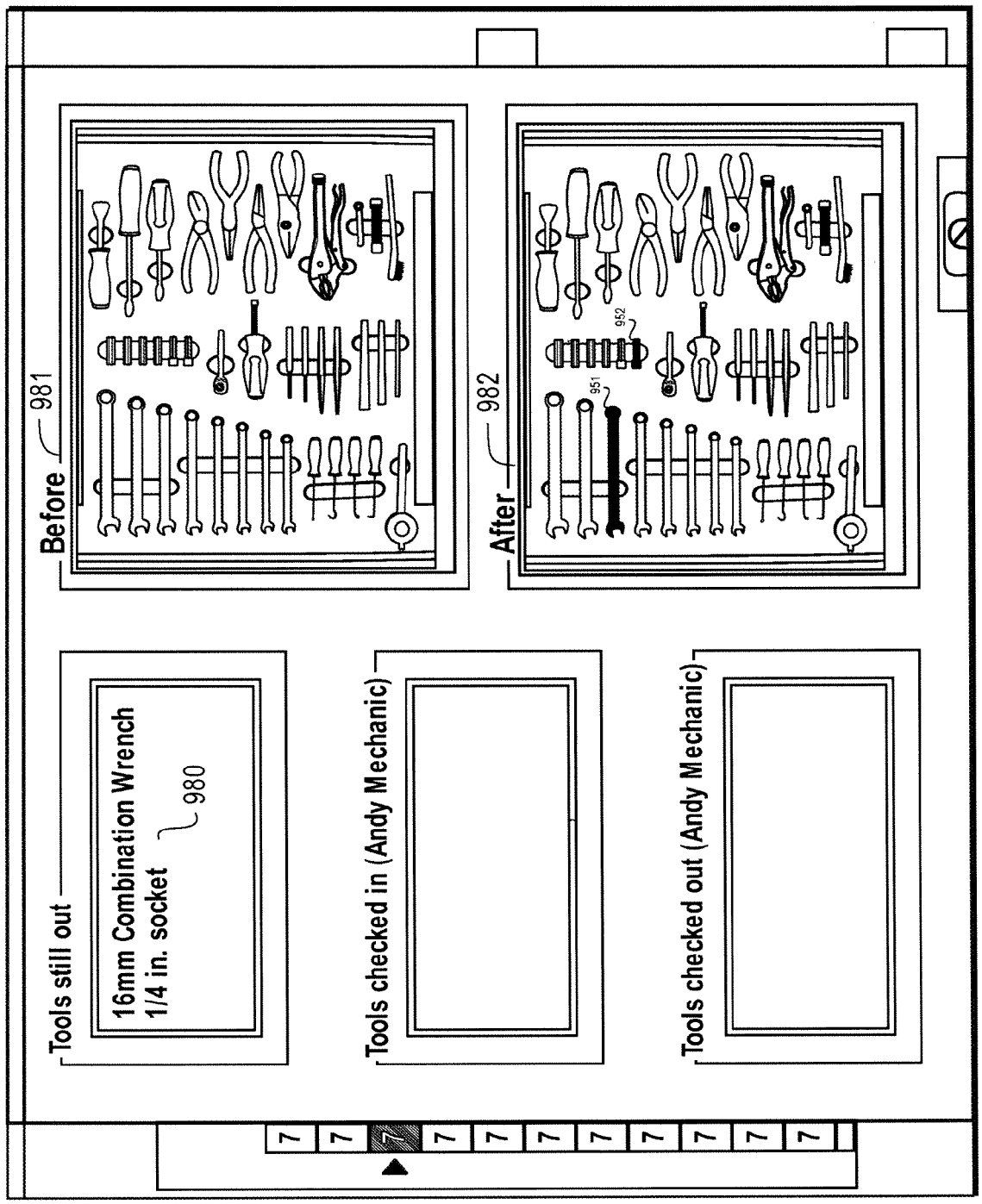

One or more images are taken during each access to storage system 800. FIG. 9*b* shows an exemplary "before access" image taken by cameras of system 800 before a user has access to the storage locations or when the drawer is moving in the first direction, as discussed earlier in this disclosure. As shown in FIG. 9*b*, each tool is properly stored in its corresponding storage location. FIG. 9*c* shows an exemplary "after access" image taken by cameras of system 800 after the access is terminated or when a storage drawer moves in the second direction as discussed earlier. As shown in FIG. 9*c*, tools corresponding to storage locations 951 and 952 are missing. Based on the image shown in FIG. 9*c*, system 800 determines that tools in storage locations 951 and 952 are missing. An audit trail is generated regarding the missing tools and the user associated with the access. FIG. 9*d* shows an exemplary record stored in system 800 and/or server 802, in which both "before access" and "after access" images 981 and 982 are stored. Missing tools are identified according to "after access" image 982 and listed in area 980.

In the previous descriptions, numerous specific details are set forth, such as specific materials, structures, processes, etc., in order to provide a thorough understanding of the present disclosure. However, as one having ordinary skill in the art would recognize, the present disclosure can be practiced without resorting to the details specifically set forth. In other instances, well known processing structures have not been described in detail in order not to unnecessarily obscure the present disclosure.

Only the illustrative embodiments of the disclosure and examples of their versatility are shown and described in the present disclosure. It is to be understood that the disclosure is capable of use in various other combinations and environments and is capable of changes or modifications within the scope of the inventive concept as expressed herein.

What is claimed is:

1. An inventory control system for monitoring the removal and replacement of objects, the system comprising:
   a plurality of storage drawers or shelves, each storage drawer or shelf including at least one storage location for storing objects;
   a door controlling access to the plurality of storage drawers or shelves, such that a user has access to the storage locations of the drawers or shelves only when the door is open;
   at least one image sensing device configured to form at least one first image of the storage locations of each of the plurality of storage drawers or shelves in response to detecting a closing of the door; and
   a data processor configured to:
      receive information representing the at least one first image of the at least one storage location of each of the plurality of storage drawers or shelves, and
      determine an inventory condition of the objects stored in each respective storage drawer or shelf according to the at least one first image.

2. The inventory control system of claim 1, wherein:
   the at least one image sensing device is further configured to form at least one second image of the storage locations of each of the plurality of storage drawers or shelves in response to detecting an opening of the door; and
   the data processor is further configured to receive information representing the at least one second image of the at least one storage location of each of the plurality of storage drawers or shelves, and determine a change in inventory condition of the objects stored in each respective storage drawer or shelf according to a difference between the at least one second image and the at least one first image.

3. The inventory control system of claim 1, further comprising:
   an access control device for authenticating a user accessing the storage drawers or shelves,
   wherein the at least one image sensing device is further configured to form at least one second image of the storage locations of each of the plurality of storage drawers or shelves in response to the access control device receiving authentication information from a user.

4. The inventory control system of claim 1, further comprising:
   an access control device for authenticating a user accessing the storage drawers or shelves,
   wherein the at least one image sensing device is configured to form the at least one first image of the storage locations of each of the plurality of storage drawers or shelves in response to detecting a closing of the door and at least one of a locking of the door and a user signing out of the access control device.

5. The inventory control system of claim 1, wherein the data processor is configured to determine a change in inventory condition of the objects stored in each respective storage drawer or shelf according to a difference between the at least one first image and a baseline image for the respective storage drawer or shelf.

6. The inventory control system of claim 5, wherein the data processor is configured to determine a change in inventory condition of the objects stored in each respective storage drawer or shelf according to the determined inventory condition of the objects stored in each respective storage drawer or shelf and information on which storage locations were previously occupied by their corresponding pre-designated objects.

7. The inventory control system of claim 1, further comprising:
   a data transceiver configured to enable communication across a network with a server,
   wherein the data transceiver uploads to the server the determined inventory condition of the objects stored in each respective storage drawer or shelf.

8. The inventory control system of claim 1, wherein the at least one image sensing device comprises a moving camera configured to move over a drawer or shelf to capture image slices and stitch the images slices together to create a full drawer or shelf image.

9. The inventory control system of claim 1, wherein the at least one image sensing device comprises a camera and a moving mirror configured to move over a drawer or shelf to redirect a camera view towards different portions of the drawer or shelf.

10. The inventory control system of claim 1, wherein the at least one image sensing device comprises a moving camera configured to move to each of the plurality of storage drawers or shelves to form first images of each of the plurality of storage drawers or shelves.

11. The inventory control system of claim 1, wherein the at least one image sensing device comprises a camera and a plurality of moving mirrors, wherein each of the plurality of moving mirrors is associated with a respective drawer or shelf of the plurality of drawers or shelves and is configured to redirect a camera view towards different portions of the respective drawer or shelf.

12. The inventory control system of claim 1, wherein:
the plurality of storage drawers or shelves comprises at least one storage drawer, and
the data processor is configured to identify an area of the storage drawer to which the user has not gained access, and determine an inventory condition of the area of the storage drawer to which the user has not gained access to remain unchanged from a previous access.

13. The inventory control system of claim 12, wherein the data processor identifies the area of the storage drawer to which the user has not gained access in response to detecting that the storage drawer has only been partially opened.

* * * * *